US010387505B2

(12) United States Patent
Glover et al.

(10) Patent No.: US 10,387,505 B2
(45) Date of Patent: Aug. 20, 2019

(54) GENERATING ADVERTISEMENTS USING FUNCTIONAL CLUSTERS

(71) Applicant: Samsung Electronics Co., Ltd., Suwon-si, Gyeonggi-do (KR)

(72) Inventors: Eric Glover, Palo Alto, CA (US); Leigh L. Klotz, Jr., Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 686 days.

(21) Appl. No.: 14/981,732

(22) Filed: Dec. 28, 2015

(65) Prior Publication Data

US 2016/0189225 A1 Jun. 30, 2016

Related U.S. Application Data

(60) Provisional application No. 62/097,508, filed on Dec. 29, 2014.

(51) Int. Cl.
*G06Q 30/00* (2012.01)
*G06F 16/951* (2019.01)
(Continued)

(52) U.S. Cl.
CPC .......... *G06F 16/951* (2019.01); *G06F 16/248* (2019.01); *G06F 16/24578* (2019.01);
(Continued)

(58) Field of Classification Search
CPC ............. G06F 16/951; G06F 16/24578; G06F 16/9535; G06F 16/9537; G06F 16/285;
(Continued)

(56) References Cited

U.S. PATENT DOCUMENTS 5,717,923 A * 2/1998 Dedrick ............. G06Q 30/0253
5,848,396 A * 12/1998 Gerace .................. G06Q 30/02
705/7.33
(Continued)

OTHER PUBLICATIONS

Kim, et al., The Effects of Adopting and Using a Brand's Mobile Application on Customers' Subsequent Purchase Behavior.Journal of Interactive Marketing, Aug. 2015. (Year: 2015).*

*Primary Examiner* — Luis A Brown
(74) *Attorney, Agent, or Firm* — Jefferson IP Law, LLP

(57) ABSTRACT

A deep linking system includes an advertising engine. The advertising engine includes one or more processors configured to receive an advertisement request and identify one or more advertisement records based on the advertisement request and triggering data included in the one or more advertisement records. The one or more processors are further configured, for each advertisement record, to identify one or more cluster records based on the underlying sponsored state of the identified advertisement record and determine an advertisement score for the identified advertisement record based on the identified cluster records. The one or more processors select one or more of the identified advertisement records based on the advertisement scores, generate advertisement objects based on the selected advertisement records, and transmit the advertisement objects to the remote device.

22 Claims, 10 Drawing Sheets

(51) Int. Cl.
*G06F 17/22* (2006.01)
*G06F 16/248* (2019.01)
*G06F 16/28* (2019.01)
*G06F 16/9535* (2019.01)
*G06F 16/9537* (2019.01)
*G06F 16/2457* (2019.01)
*G06Q 30/02* (2012.01)

(52) U.S. Cl.
CPC ........ *G06F 16/285* (2019.01); *G06F 16/9535* (2019.01); *G06F 16/9537* (2019.01); *G06F 17/2235* (2013.01); *G06Q 30/0257* (2013.01); *G06Q 30/0261* (2013.01); *G06Q 30/0275* (2013.01)

(58) Field of Classification Search
CPC .............. G06F 16/248; G06F 17/2235; G06Q 30/0275; G06Q 30/0261; G06Q 30/0257
USPC .......... 705/14.55, 14.71, 14.73, 14.49, 14.72
See application file for complete search history.

(56) References Cited

U.S. PATENT DOCUMENTS

| | | | | |
|---|---|---|---|---|
| 5,991,735 A * | 11/1999 | Gerace | G06Q 30/02 | 705/7.29 |
| 7,853,700 B2 * | 12/2010 | Lee | G06Q 30/02 | 705/7.29 |
| 7,962,604 B1 * | 6/2011 | Morris | G06Q 30/02 | 705/14.4 |
| 8,321,534 B1 * | 11/2012 | Roskind | H04N 21/25808 | 348/194 |
| 8,666,811 B1 * | 3/2014 | Chen | G06Q 30/00 | 705/14.26 |
| 9,152,674 B2 * | 10/2015 | Glover | G06F 16/24578 | |
| 9,418,103 B2 | 8/2016 | Shapira et al. | | |
| 9,436,730 B2 | 9/2016 | Li et al. | | |
| 9,720,672 B2 | 8/2017 | Lipton et al. | | |
| 9,792,101 B2 * | 10/2017 | Boudville | G06F 16/95 | |
| 2001/0029525 A1 * | 10/2001 | Lahr | G06F 16/9566 | 709/218 |
| 2002/0042738 A1 * | 4/2002 | Srinivasan | G06Q 30/02 | 705/14.43 |
| 2003/0106022 A1 * | 6/2003 | Goodacre | H04M 1/72525 | 715/226 |
| 2004/0088397 A1 | 5/2004 | Becker et al. | | |
| 2005/0038933 A1 | 2/2005 | Himmel et al. | | |
| 2005/0096979 A1 * | 5/2005 | Koningstein | G06Q 10/10 | 705/14.68 |
| 2005/0096980 A1 * | 5/2005 | Koningstein | G06Q 30/00 | 705/14.41 |
| 2005/0235048 A1 * | 10/2005 | Costa-Requena | H04L 29/06027 | 709/219 |
| 2006/0074769 A1 * | 4/2006 | Looney | G06Q 30/02 | 705/14.66 |
| 2006/0149624 A1 * | 7/2006 | Baluja | G06Q 30/0255 | 705/14.53 |
| 2006/0271438 A1 * | 11/2006 | Shotland | G06Q 30/02 | 705/14.46 |
| 2007/0022442 A1 * | 1/2007 | Gil | G06Q 30/02 | 725/62 |
| 2007/0300152 A1 * | 12/2007 | Baugher | G06Q 30/0243 | 715/210 |
| 2008/0092159 A1 * | 4/2008 | Dmitriev | G06Q 30/0269 | 725/34 |
| 2009/0055523 A1 * | 2/2009 | Song | H04L 67/22 | 709/224 |
| 2010/0036717 A1 * | 2/2010 | Trest | G06Q 30/0207 | 705/14.1 |
| 2010/0070373 A1 * | 3/2010 | Zoeter | G06Q 30/02 | 705/14.71 |
| 2010/0222040 A1 * | 9/2010 | Bosan | G06Q 30/02 | 455/414.1 |
| 2011/0040756 A1 | 2/2011 | Jones et al. | | |
| 2012/0030670 A1 | 2/2012 | Vijay et al. | | |
| 2012/0254188 A1 * | 10/2012 | Koperski | G06F 16/285 | 707/740 |
| 2012/0278722 A1 * | 11/2012 | Raleigh | H04L 12/14 | 715/735 |
| 2012/0289147 A1 * | 11/2012 | Raleigh | H04L 67/2847 | 455/3.06 |
| 2013/0018731 A1 * | 1/2013 | Morris | G06Q 30/02 | 705/14.66 |
| 2013/0311285 A1 * | 11/2013 | Abrol | G06F 16/951 | 705/14.54 |
| 2013/0337785 A1 * | 12/2013 | Delug | H04W 4/60 | 455/414.1 |
| 2014/0052645 A1 | 2/2014 | Hawes et al. | | |
| 2014/0172563 A1 * | 6/2014 | Amit | G06Q 50/01 | 705/14.54 |
| 2014/0236386 A1 * | 8/2014 | Yoshizawa | B60W 30/08 | 701/1 |
| 2014/0250106 A1 * | 9/2014 | Shapira | G06F 3/04842 | 707/722 |
| 2014/0258013 A1 * | 9/2014 | Collins | G06Q 30/0625 | 705/26.3 |
| 2014/0258014 A1 * | 9/2014 | Collins | G06Q 30/0241 | 705/26.3 |
| 2014/0316890 A1 * | 10/2014 | Kagan | G06Q 30/0256 | 705/14.54 |
| 2015/0095160 A1 * | 4/2015 | Ma | G06Q 30/0267 | 705/14.64 |
| 2015/0134436 A1 * | 5/2015 | Lambert | G06Q 30/00 | 705/14.26 |
| 2015/0161149 A1 * | 6/2015 | Genera | G06F 16/9537 | 707/711 |
| 2015/0193546 A1 * | 7/2015 | Lipton | G06F 9/445 | 717/178 |
| 2015/0227633 A1 * | 8/2015 | Shapira | G06F 16/2425 | 707/706 |
| 2015/0254367 A1 * | 9/2015 | Kagan | G06F 16/248 | 707/706 |
| 2015/0332310 A1 * | 11/2015 | Cui | G06Q 30/0244 | 705/14.45 |
| 2015/0371263 A1 * | 12/2015 | Kagan | G06F 16/9535 | 705/14.54 |
| 2016/0034957 A1 * | 2/2016 | Kagan | G06F 16/9535 | 705/14.54 |
| 2016/0063535 A1 * | 3/2016 | Xu | G06Q 30/0241 | 705/14.4 |
| 2016/0085521 A1 * | 3/2016 | Savliwala | G06F 16/22 | 717/108 |
| 2016/0092919 A1 * | 3/2016 | Coleman, Jr. | G06Q 30/0255 | 705/14.53 |
| 2016/0148262 A1 * | 5/2016 | Glover | G06F 16/9535 | 705/14.54 |
| 2016/0162555 A1 * | 6/2016 | Shapira | G06F 16/248 | 707/722 |
| 2016/0189225 A1 * | 6/2016 | Glover | G06F 16/9535 | 705/14.55 |
| 2016/0307237 A1 * | 10/2016 | Glover | G06Q 30/0275 | |
| 2016/0313893 A1 * | 10/2016 | Xu | G06F 3/0481 | |
| 2017/0140421 A1 * | 5/2017 | Filev | G06Q 30/02 | |
| 2017/0178038 A1 * | 6/2017 | Guven | G06Q 10/0635 | |
| 2017/0207915 A1 * | 7/2017 | Reed | H04L 63/0823 | |
| 2017/0329591 A1 * | 11/2017 | Lipton | G06F 9/445 | |

* cited by examiner

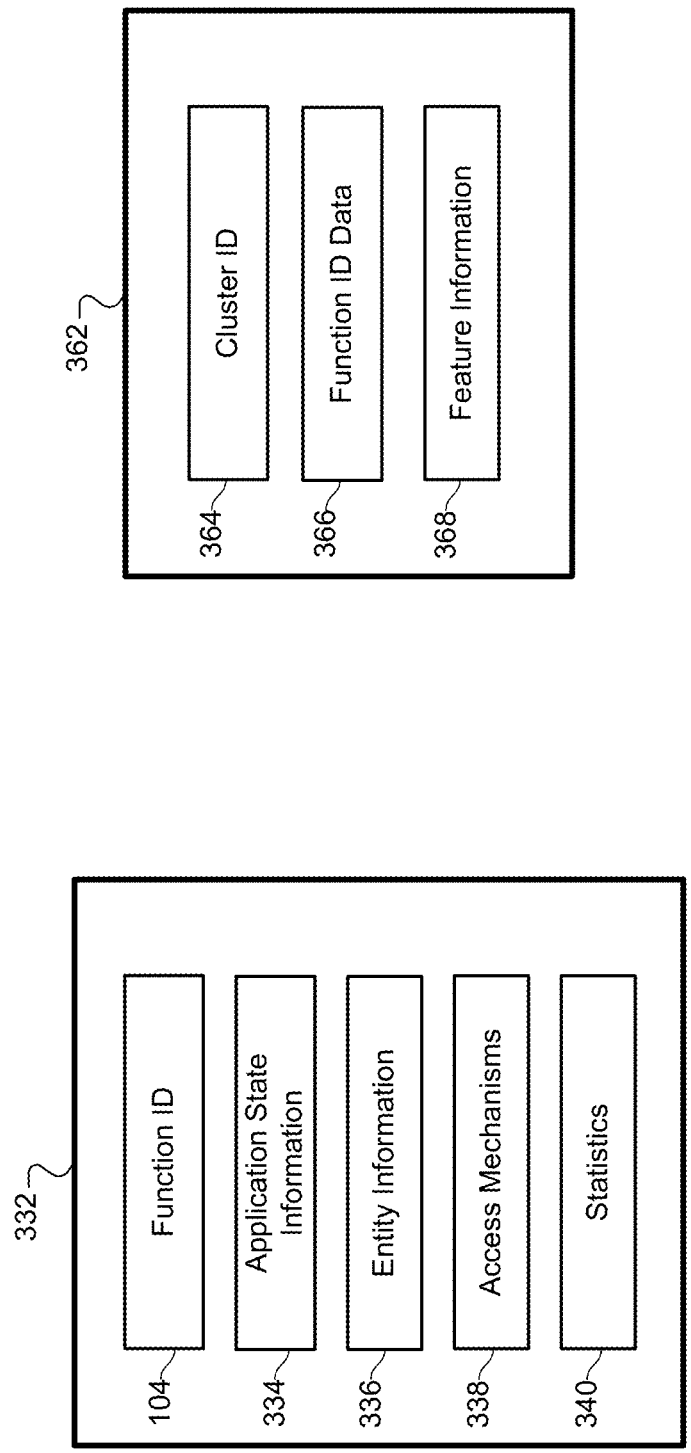

GENERATING ADVERTISEMENTS USING FUNCTIONAL CLUSTERS

CROSS-REFERENCE TO RELATED APPLICATIONS

This application claims the benefit of U.S. Provisional Application No. 62/097,508, filed on Dec. 29, 2014. The entire disclosure of the application referenced above is incorporated herein by reference.

TECHNICAL FIELD

This disclosure relates to clustering states of software applications and using the clusters to improve relevancy of search results.

BACKGROUND

Many software applications offer multiple functions to users. Further, most users do not use all the functions of the software application. For example, a restaurant related software application may offer functions for finding restaurants by cuisine, viewing photographs of dishes, search menus of restaurants, and read reviews of specific restaurants. Most users of this software application, however, may only really utilize the viewing photographs of dishes. Another software application may offer similar functions; however, users of the other application may overwhelmingly prefer the search by cuisine and read review functions of this application.

SUMMARY

The details of one or more implementations of the disclosure are set forth in the accompanying drawings and the description below. Other aspects, features, and advantages will be apparent from the description and drawings, and from the claims.

In one example, the present disclosure is directed to a deep linking system comprising a storage system and an advertising engine. The storage system stores a plurality of application records, each application record including i) a state identifier that indicates a state of a respective software application, and ii) application state information corresponding to the state of the software application. The storage system further stores a plurality of advertisement records, each advertisement record corresponding to a sponsored application state and including i) a sponsored state identifier that indicates the sponsored state; ii) triggering data indicating data that triggers the advertisement record; iii) bid data indicating a value to be paid in consideration for an action performed with respect to the advertisement record; and iv) display data that is included in an advertisement. The storage system further stores a plurality of cluster records, each cluster record defining a respective cluster of a plurality of clusters identified by the deep linking system, each cluster including a respective plurality of clustered state identifiers, each clustered state identifier identifying a state of a respective software application, wherein the plurality of clusters are clustered according to one or more features. The advertising engine includes a processing system, the including one or more processors that execute computer-readable instructions. The one or more processors may be configured to receive an advertisement request and identify one or more advertisement records from the storage system based on the advertisement request and triggering data included in the one or more advertisement records. For each advertisement record, the one or more processors may be configured to identify one or more cluster records from the plurality of cluster records to which the sponsored state indicated by the identified advertisement record belongs based on the sponsored state identifier defined in the identified advertisement record. The one or more processors may also be configured, for each advertisement record, to determine an advertisement score of the identified advertisement record based on cluster features of the one or more clusters to which the sponsored state belongs and the bid data defined in the identified cluster record. The one or more processors may further be configured to select one or more of the identified advertisement records based on the respective advertisement scores of the identified advertisement records and generate one or more advertisement objects based on the selected advertisement records. The one or more processors are further configured to transmit the one or more advertisement objects to the remote device.

In another example, the present disclosure is directed to a method comprising maintaining, by a processing system including one or more processors, a plurality of application records, each application record including i) a state identifier that indicates a state of a respective software application, and ii) application state information corresponding to the state of the software application. The method further comprises maintaining a plurality of advertisement records, each advertisement record corresponding to a sponsored application state and including i) a sponsored state identifier that indicates the sponsored state; ii) triggering data indicating data that triggers the advertisement record; iii) bid data indicating a value to be paid in consideration for an action performed with respect to the advertisement record; and iv) display data that is included in an advertisement. The method further comprises maintaining a plurality of cluster records, each cluster record defining a respective cluster of a plurality of clusters identified by the deep linking system, each cluster including a respective plurality of clustered state identifiers, each clustered state identifier identifying a state of a respective software application, wherein the plurality of clusters are clustered according to one or more features. The method further comprises receiving an advertisement request and identifying one or more advertisement records from the plurality of advertisement records based on the advertisement request and the triggering data. The method further comprises, for each advertisement record, identifying one or more cluster records from the plurality of cluster records to which the sponsored state indicated by the identified advertisement record belongs based on the sponsored state identifier defined in the identified advertisement record. The method further comprises, for each advertisement record, determining an advertisement score of the identified advertisement record based on cluster features of the one or more clusters to which the sponsored state belongs and the bid data defined in the identified cluster record. The method further comprises selecting one or more of the identified advertisement records based on the respective advertisement scores of the identified advertisement records. The method further comprises generating one or more advertisement objects based on the selected identified advertisement records, each advertisement object defining a sponsored link when rendered at a user device. The method further comprises transmitting the one or more advertisement objects to the remote device.

DESCRIPTION OF DRAWINGS

FIG. 3B is a schematic view of an example application state record.

FIG. 3C is a schematic view of an example cluster record.

Like reference symbols in the various drawings indicate like elements.

DETAILED DESCRIPTION

The figures and following description relate to example implementations by way of illustration only. It should be noted that from the following discussion, alternative implementations of the structures and methods disclosed herein will be readily recognized as viable alternatives that may be employed without departing from the scope of the disclosure. This disclosure describes techniques for generating sponsored links to application states using functional clusters.

The present disclosure relates to advertising states of software applications. A deep-linking system of the present disclosure can include an analytics engine, an advertising engine, and a search engine. The analytics engine of the present disclosure can be configured to collect usage data from consenting user devices. The analytics engine can further generate and store information regarding applications and their application states in application records, whereby each application record corresponds to a particular application state. The analytics engine can further identify and group application records into clusters based on the function the corresponding application state performs and the various features associated with that particular application state (e.g., geographic location, time of day, popularity).

The advertising engine can receive an advertisement request (e.g., from a search system and/or user device), identify one or more application states that satisfy the advertisement request, and generate one or more sponsored links. The advertising engine can transmit the sponsored links to a requesting user device, server device, or any other suitable recipient. The advertising engine can utilize the analytics engine and the clusters of application states generated by the analytics engine to provide sponsored links. The advertising engine can identify clusters to which candidate sponsored links belong, and in part can utilize the features of the clusters to determine whether to deliver the sponsored link. For example, the features of the cluster(s) and/or the state indicated by the sponsored link to calculate an advertisement score. The advertisement score is used to determine whether to provide the advertisement to the user device.

Figure 1A:
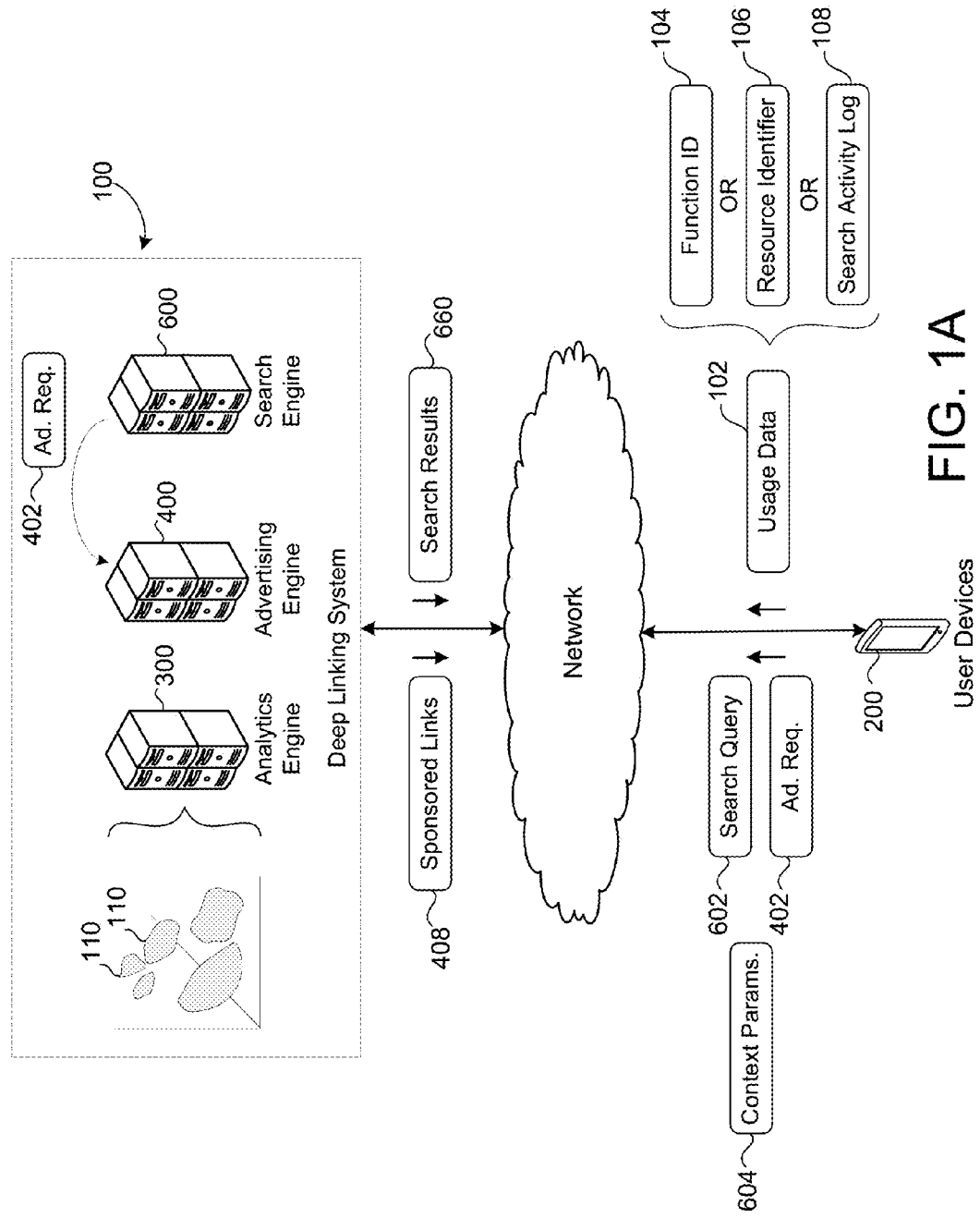
FIG. 1A is a schematic view of an example environment of a deep-linking system.

FIG. 1A illustrates an example environment 10 of a deep-linking system 100. A deep-linking system 100 is a collection of computing devices that generates user-selectable links that link to states of software applications and provides the user-selectable links to one or more user devices 200. A user selectable link (or link) is an object that is displayed by a user device 200 that includes one or more underlying access mechanisms (described in greater detail below). When a user selects a user selectable link, the user device 200 can access a state of a software application using an access mechanism included in the selected link. While the user device 200 in FIG. 1A is depicted as a smartphone, a user device 200 can be any suitable user computing device including, but not limited to, a tablet computing device, a personal computing device, a laptop computing device, a gaming device, a vehicle infotainment device, and/or a smart appliance (e.g., smart refrigerator or smart television).

The deep-linking system 100 can include an advertising engine 400. In the illustrated example, the deep-linking system 100 further includes an analytics engine 300 and a search engine 600. In the illustrated example, the search engine 600 is depicted as being a part of the deep-linking system 100 for ease of explanation. In some implementations, however, the search engine 600 may be independent and not affiliated with the deep-linking system 100. In such examples, an external search engine 600 can interact with the deep-linking system 100 via the network and via an application programming interface (API) of the advertising engine 400.

In operation, the advertising engine 400 can receive an advertisement request 402 from a user device or a server device (e.g., a search system such as the search engine 600) and transmit sponsored links 408 based on the received advertisement request 402. The search engine 600 can be configured to receive a search query 602 and context parameters 604 from a user device 200. The search engine 600 can further be configured to identify application states that satisfy the search query and transmit search results 660 linking to the identified application states to the user device 200. The search engine 600 can also be configured to generate an advertisement request 402 based on the search query 602 and/or search results 660 and transmit the advertisement request 402 to the advertising engine 400. The advertising engine 400 returns sponsored links to the search engine 600 in response to the advertisement request 402. The search engine 600 can include the returned sponsored link 408 in the search results 660 before transmitting the search results 660 to the requesting user device 200.

The analytics engine 300 is configured to collect usage data 102 from a plurality of user devices 200. Usage data 102 can include any data that indicates the states of software applications that a user device 200 is accessing or has accessed. The usage data 102 may further include information such as a time, day, and/or location at when each state was accessed. Additionally or alternatively, usage data 102 can indicate a search activity log 108, which indicates individual search results that were selected by a user of the user device 200 given a search query 602. Put another way, the search activity log 108 indicates states of software applications that a user accessed when presented with search results 660 in response to a search query 602. The foregoing may be represented by an indicator of the search query 602 and a list of one or more states that were accessed in response to the search results 660 corresponding to the search query 602. As the individual search results link to different states of one or more software applications, the selection of an individual search result can be indicative of a state of a software application that the user found relevant given a particular search. Selection of the individual search result causes the user device 200 to access a state of a software application using an edition of the software application. A state of a software application may be represented by a function identifier 104 (or "function ID") or a resource identifier 106 (both of which are described in greater detail below). The analytics engine 300 can receive the usage data 102 and identify different clusters 110 of states of software applications.

A software application can refer to a software product that causes a computing device to perform a function. In some examples, a software application may also be referred to as an "application," "an app," or a "program." Example software applications include, but are not limited to, productivity applications, social media applications, messaging applications, media streaming applications, social networking applications, and games. Software applications can perform a variety of different functions for a user. For example, a restaurant reservation application can make reservations for restaurants. As another example, an internet media player application can stream media (e.g., a song or movie) via the Internet. In some examples, a single software application can provide more than one function. For example, a restaurant reservation application may also allow a user to retrieve information about a restaurant and read user reviews for the restaurant in addition to making reservations. As another example, an internet media player application may also allow a user to perform searches for digital media, purchase digital media, generate media playlists, and share media playlists. The functions of an application can be accessed using native application editions of the software application and/or web application editions of the software application.

A native application edition (or "native application") is, at least in part, installed on a user device 200. In some scenarios, a native application is installed on a user device 200, but accesses an external resource (e.g., an application server) to obtain data and/or instruction from the external resource. For example, social media applications, weather applications, news applications, and search applications may respectively be accessed by one or more native application editions that execute on various user devices 200. In such examples, a native application can provide data to and/or receive data from the external resource while accessing one or more functions of the software application. In other scenarios, a native application is installed on the user device 200 and does not access any external resources. For example, some gaming applications, calendar applications, media player applications, and document viewing applications may not require a connection to a network to perform a particular function. In these examples, the functionality of the software application is encoded in the native application editions itself. The native application edition is able to access the functions of the software application without communicating with any other external devices.

Web application editions (also referred to as "web applications") of a software application may be partially executed by a user device 200 (e.g., by a web browser executed by the user device 200) and partially executed by a remote computing device (e.g., a web server or application server). For example, a web application may be an application that is executed, at least in part, by a web server and accessed by a web browser (e.g., a native application) of the user device 200. Example web applications may include, but are not limited to, web-based email, online auctions websites, social-networking websites, travel booking websites, and online retail websites. A web application accesses functions of a software product via a network. Examples implementations of web applications include websites and/or HTML-5 application editions.

In some scenarios, a software application may be accessed by one or more native application editions of the software application and/or one or more web application editions of the software application. In these scenarios, there may be overlap between the states or functions that the native application edition(s) can access and the states or functions that the web application edition can access. For example, a restaurant review application may have reviews of thousands of restaurants and may also provide an on-line ordering function from some of the restaurants. The restaurant review application may be accessed by a first native application edition configured for a first operating system (e.g., the ANDROID operating system maintained by Google, Inc.), a second native application edition configured for a second operating system (e.g., the IOS operating system developed by Apple, Inc.), and a web application edition (e.g., a website) of the restaurant review application. The restaurant review application may allow all the editions (native and web) to access the various reviews of restaurants but may only allow on-line orders to be placed using the native application editions. In this way, some states or functions of the restaurant review application cannot be accessed by the web application edition but there is overlap between the states or functions that can be accessed by the native application editions and the web application edition.

A state of a software application can refer to a parameterized function of the software application. A software application can perform one or more functions. A function is a service of the software application that can be accessed by a user device 200 via an edition of the software application. Non-limiting examples of functions can include "making a restaurant reservation" (which may parameterized with a restaurant identifier, a date, and a time), "searching for a cuisine" (which may be parameterized with a cuisine type and a location), "view flight prices" (which may be parameterized with departure and arrival airport codes, arrival and departure dates, and round trip flags), "request a driver" (which may be parameterized with a pick-up location), and "view a file" (which may be parameterized with a file identifier). A state of a software application can be accessed from a user device using an edition of the software application. An operating system of a user device 200 can instruct an edition of a software application to access a state of the software application using an access mechanism (e.g., a resource identifier 106). In some implementations, the state of a software application may be represented by a function ID 104, discussed in greater detail below.

A user device 200 can access a state of a software application via an edition of the software application using an access mechanism. When rendering a user selectable link (e.g., in the set of search results 660) a user device 200 displays the user selectable link such that can be selected by a user of the user device 200. A user selectable link may include one or more underlying access mechanisms. A user selectable link, when selected by a user, causes the user device 200 to access a state of the software application using an edition of the software application identified by the access mechanism.

Access mechanisms may include at least one of a native application access mechanism (hereinafter "application access mechanism"), a web access mechanism, and an application download mechanism. The user device 200 may use the access mechanisms to access functionality of applications. For example, the user may select a user selectable link including an access mechanism in order to access functionality of an application indicated in the user selectable link. As described herein, the deep-linking system 100 may transmit one or more application access mechanisms, one or more web access mechanisms, and one or more application download mechanisms to the user device 200 in the sponsored links 408 and/or search results 660.

An application access mechanism may be a string that includes a reference to a native application (e.g., one of native applications 212 installed on the user device 200) and indicates one or more operations for the user device 200 to perform. If a user selects a user selectable link including an application access mechanism, the user device 200 may launch the native application referenced in the application access mechanism and perform the one or more operations indicated in the application access mechanism.

A web access mechanism may include a resource identifier that includes a reference to a web resource (e.g., a page of a web application/website). For example, a web access mechanism may include a uniform resource locator (URL) (i.e., a web address) used with hypertext transfer protocol (HTTP). If a user selects a user selectable link including a web access mechanism, the user device 200 may launch the web browser application 216 and retrieve the web resource indicated in the resource identifier. Put another way, if a user selects a user selectable link including a web access mechanism, the user device 200 may launch the web browser application 216 and access a state (e.g., a page) of a web application/website. In some examples, web access mechanisms may include URLs for mobile-optimized sites and/or full sites.

An application download mechanism may indicate a site (e.g., a digital distribution platform) where a native application can be downloaded in the scenario where the native application is not installed on the user device 200. If a user selects a user selectable link including an application download address, the user device 200 may access a digital distribution platform from which the referenced native application may be downloaded. The user device 200 may access a digital distribution platform using at least one of the web browser application 216 and one of the native applications 212.

As previously described, a function ID 104 is a string of alphabetic, numeric, and/or symbolic characters (e.g., punctuation marks) that uniquely identifies a state of an application. Put another way, a function ID 104 is a unique reference to a state of an application. In some implementations, a function ID 104 can be in the format of a resource identifier. For example, the function ID 104 may be a uniform resource locator (URL) or an application resource identifier. In these implementations, the function ID 104 may be used by a user device to access a software application via a web application edition or one or more native application editions of the software application, respectively.

In some implementations, a function ID 104 can map to one or more access mechanisms. In these implementations, a function ID 104 may map to a web resource identifier (e.g., a URL), one or more application resource identifiers, and/or one or more scripts. For instance, a state of an example software application, "exampleapp," may be accessed via a web application edition and two native application editions (e.g., an edition configured for the ANDROID operating system and an edition configured for the WINDOWS PHONE operating system). In this example, the web resource identifier may be www.exampleapp.com/param1=abc¶m2=xyx, the first application resource identifier may be android.exampleapp::param1=abc¶m2=xyx, and the second application resource identifier may be windows.exampleapp::param1=abc¶m2=xyx. In this example, a function ID 104 may map to the web resource identifier and the two application resource identifiers.

In some implementations, a function ID 104 may have a URL-like structure that utilizes a namespace other than http://, such as "func://" which indicates that the string is a function ID 104. In the example of "exampleapp" above, the function ID 104 corresponding to the example state may be func://exampleapp::param1=abc¶m2=xyx, which may map to the access mechanisms described above. In this example, the function ID 104 can be said to be parameterized, whereby the value of "param1" is set to "abc" and the value of "param2" is set equal to "xyz."

In some implementations, a function ID 104 may take the form of a parameterizable function. For instance, a function ID 104 may be in the form of "app_id[action(param_1, param_2, . . . , parameter_n)]", where app_id is an identifier (e.g., name) of a software application, action is an action that is performed by the application (e.g., "view menu"), and parameter_1 . . . parameter_n are n parameters that the software application receives in order to access the state corresponding to the action and the parameters. Drawing from the example above, a function ID 104 may be "exampleapp[example_action(abc, xyz)]". In this example, the function ID 104 can be said to be parameterized, whereby the value of "param1" is set to "abc" and the value of "param2" is set equal to "xyz." Given this function ID 104 and the referencing schema of the example application, the foregoing function ID 104 may be used to generate or look up the access mechanisms defined above. Furthermore, while function IDs 104 have been described with respect to resource identifiers, a function ID 104 may be used to generate or look up one or more scripts that access a state of a software application. Further, a function ID 104 may take any other suitable format. For example, the function ID 104 may be a human-readable string that describes the state of the application to which the function ID 104 corresponds.

In some implementations, the deep-linking system 100 includes a search engine 600. The search engine 600 may be configured to communicate with the advertising engine 400 in order to provide sponsored links 408 with a set of search results 660. A search engine 600 receives a search query 602 and, in some implementations, one or more context parameters 604. The search query 602 includes one or more query terms. A context parameter 604 is additional information that may be included with the search query 602, such as a geolocation of the user device 200 at the time of the search query 602, an operating system type of the user device 200, and/or an identifier of the user of the user device (e.g., a username or profile ID). In some implementations, the user device 200 generates a query wrapper that contains the search query 602 and the context parameter(s) 604. The user device transmits the search query 602 and zero or more context parameters 604 to the search engine 600. In these implementations, the user device 200 may utilize a native application 212 (i.e., a native search application 212) to communicate with the search engine 600.

In response to a search query the search engine 600 can identify one or more states of software applications that are relevant to the search query and can transmit search results 660 linking to the identified states to the user device 200. The search results 660 may be displayed as user-selectable links, whereby a user selectable link includes a display element and one or more underlying access mechanisms.

The display element may indicate the accessible content upon selection of the user selectable link. In some examples, the display element may be text. In other examples, the display element may be a card that includes additional information, such as an icon, an image, a textual description, or other information. The search results may include one or more link objects, whereby the user device 200 can render a user selectable link (e.g., a search result or a sponsored link 408) based on the link object. Result objects may be link objects that correspond to search results and advertisement objects may be link objects that correspond to sponsored links 408. A result object can contain data and instructions that, when rendered by a user device 200, result in an individual search result 660 that includes one or more user selectable links. A result object can include a function ID 104 and/or one or more access mechanisms, a layout file, and result data (e.g., data retrieved from an application state record) that correspond to a state of a software application. Examples of content may be text descriptions of a state of a software application, icons, screenshots of the state, and data used to populate the individual search result. For instance, if the result object of an individual search result corresponds to a state of a restaurant review application (e.g., a review of a specific restaurant), the result data may include an icon of the application, a number of star ratings of the restaurant, a price rating (e.g., is the restaurant expensive or cheap), and any information that may be displayed in the user selectable link. In some implementations, the user device 200 utilizes the function ID 104 to determine the one or more access mechanisms (e.g., a URL, one or more application resource identifiers, and/or a script) that may be included in the corresponding user selectable link. A user selectable link, when selected (e.g., pressed on or clicked on) by a user, instructs the user device 200 to access the resource identified by the underlying access mechanism(s).

In some implementations, the search engine 600 may transmit an advertisement request 402 to the advertising engine 400. In response, the search engine 600 can receive advertisement objects from the advertising engine 400, which the search engine 600 can include in the search results. An advertisement object may be a data structure (e.g., a link object) that contains data and/or instructions that the user device utilizes to generate a sponsored link 408 (i.e., a link to a sponsored application state). The advertisement object may include one or more access mechanisms that link to the sponsored state, as well as other information for displaying the link, such as a title of the sponsored state, a description of the sponsored state, an application name, an application icon, and/or any other suitable content. The search engine 600 may request the advertisement objects from the advertising engine 400 via an advertisement request 402. The search engine 600 can receive one or more advertisement objects from the advertising engine 400 in response to the advertisement request 402. In this way, the search engine 600 can include advertisement objects in the search results 660 that the search engine 600 transmits to a user device 200 (e.g., FIG. 1B, discussed in detail below).

As previously mentioned, the analytics engine 300 collects usage data 102 from a plurality of user devices 200, whereby the usage data 102 can indicate a resource identifier 106, a function ID 104, and/or search activity log 108. In some implementations, the analytics engine 300 identifies the states of software applications accessed by users of user devices 200 that provided the usage data 102. The usage data 102 may be anonymized, thereby minimizing risks to the privacy of a user. Additionally a user device 200 may collect and transmit usage data 102 only when a user explicitly agrees to share such usage data 102.

In some implementations, the analytics engine 300 generates or updates application state records 332 (FIG. 3B) corresponding to the received usage data 102. As will be discussed, an application state record corresponds to a particular state of a software application. In some implementations, the application state record includes a function ID 104 corresponding to the state as well as a set of features. The features can include ontological features corresponding to the state and/or statistical features regarding the state. For example, ontological features of the state may include entity information as well as function information (e.g., "view menu" or "make flight reservation").

Entity information corresponding to a state of a software application can define one or more entities corresponding to the state and the entity types of the respective entities. An entity can refer to a logical unit or value (e.g., a person, place, thing, or number) that is known to the deep-linking system 100 and able to be categorized by an ontology of the deep-linking system 100. An entity type can refer to a categorization of an entity. An entity can have more than one entity type. For example, the entity "New York Yankees" may have the entity types "professional sports team," "New York professional sports team," and "Major League Baseball team" associated therewith. Furthermore, entity types may be subtypes of other entity types. For example, the entity type "New York professional sports teams" may be a subtype of the entity type "professional sports teams." As will be discussed in greater detail below, the relationship between entities and entity types may be defined in accordance with an entity ontology (FIG. 3D).

Functional information corresponding to a state of an application can define a function performed by the software application when in the given state. In some implementations, a given state can perform more than one function (e.g., make reservations for a restaurant and see reviews of the restaurant). The functional information corresponding to a known collection of software applications may be defined according to a functional ontology, which is discussed below (FIG. 3E).

Statistical features can include any statistics regarding a state of a software application. The statistics may be based, at least in part, on the usage data 102 received by the analytics engine 300. Examples of statistical features may include a value indicating how many times the state of the software application is accessed by user devices and a rate at which the state is accessed. The record may further store geographical features. Geographical features may indicate a location from which the state was accessed and a language corresponding to the state. Geographical features may also define particular locations that the application state record corresponds. For example, if the application state record pertains to a specific restaurant, the geographical features may also define a location of the restaurant.

The analytics engine 300 can determine clusters of application state records 332 (or function IDs 104 thereof) based on the various features. In some implementations, the analytics engine 300 clusters application state records based on a specific set of features. For example, the analytics engine 300 may cluster records based on entity types and location. The resulting clusters 110 may, for example, result in a first cluster that corresponds to popular states of software applications relating to restaurants in Mountain View, Calif., a second cluster that corresponds to popular states of software applications relating to bars in New York City, and a third cluster that corresponds to unpopular states of software applications relating to eateries in Des Moines, Iowa. The foregoing may be three of many clusters that are clustered according to entity type, location, and popularity. The states of the software applications may be represented by the function IDs 104. Thus, the function IDs 104 in the first cluster may include a function ID 104 identifying a state of a first software application where users can read reviews of a particular restaurant in Mountain View, a second function ID 104 identifying a state of a second software application where users can view a photograph of a particular dish served at a different restaurant in Mountain View, and a third function ID 104 identifying a state of a third software application where users can make a reservation at yet another restaurant in Mountain View.

The analytics engine 300 may identify hundreds, thousands, or millions of clusters, as the analytics engine 300 clusters the application state records 332 with respect to certain set of features. Furthermore, the analytics engine 300 may cluster the application state records with respect to different sets of features, thereby identifying clusters 110 that identify different information. For example, clusters 110 that are identified based on function, geographic location, and time of the day may indicate the types of actions certain users perform on their user devices 200 at certain times of the day. For instance, such clusters may reveal that users in Los Angeles are more likely to access applications states that present movie reviews on a Friday night than users in San Diego. Implementations of the analytics engine 300 are described in greater detail below.

In some implementations, an advertising engine 400 utilizes the clusters to target sponsored links 408 to particular users. An advertising engine 400 receives an advertisement request 402 and returns one or more advertisement objects based on the request. An advertisement request 402 can include information that triggers an advertisement record 432. An example of information that would trigger an advertisement record 432 is a function ID 104 indicating a state of a software application represented in a search result or a state of a software application being accessed by a user device. For example, an advertisement record 432 may be triggered when its associated triggering data 436 indicates a function ID 104 of the advertisement request 402. In another example, an advertisement record 432 may be triggered based on keyword text-based matching between terms included in the advertisement record 432 (e.g., in the triggering data 436) and terms of an advertisement request 402. The advertising engine 400 can generate advertisement objects based on the triggered advertisement records 432. The advertising engine 400 may transmit the generated advertisement objects to a user device 200 or search system (e.g., the search engine 600). In some implementations, an advertisement request 402 may trigger more advertisement records 432 than requested in the advertisement request 402. The advertising engine 400 is further configured to select which of the triggered advertisement records 432 will be used to generate advertisement objects. In these examples, the advertising engine 400 may select advertisement objects based on the clusters associated with the triggered advertisement records 432 and the one or more function IDs defined in the advertisement request 402. Techniques for selecting between advertisement records 432 that satisfy an advertisement request 402 are discussed in more detail below.

In some examples, the advertising engine 400 may transmit advertisement objects to a search engine 600. In these examples, the search engine 600 may utilize the advertisement objects to include sponsored links 408 in a set of search results 660. In some examples, the advertising engine 400 may transmit advertisement objects to a user device 200 executing a native application. In these examples, the native application may utilize an advertisement object to display a sponsored link 408 within or alongside the content of an application state associated with the native application. Implementations of the advertising engine 400 are described in greater detail below.

Figures 1B, 1C:
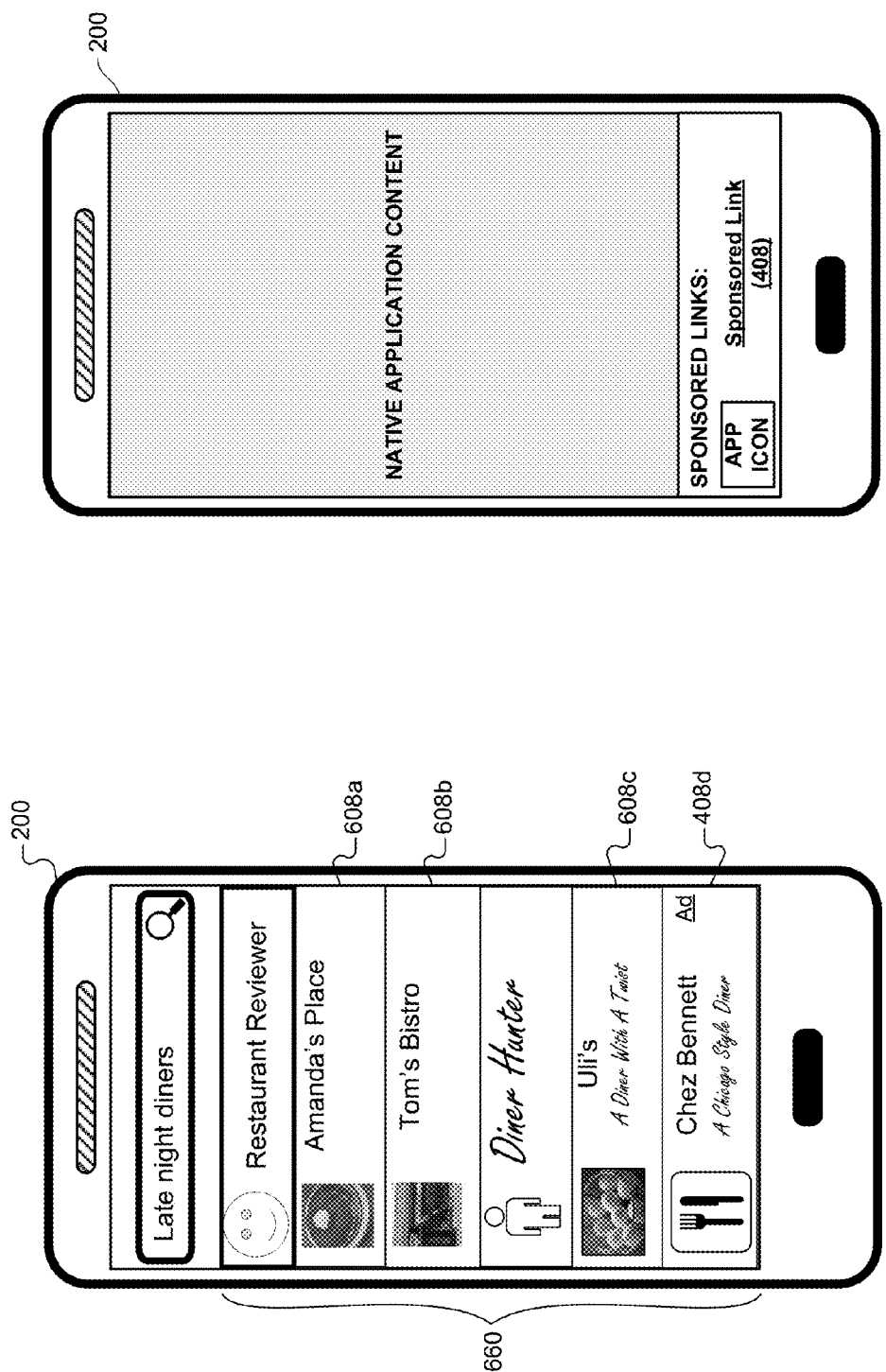
FIG. 1B is a schematic view of a user device displaying example search results.
FIG. 1C is a schematic view of a user device displaying an example sponsored link.

FIGS. 1B and 1C illustrate examples of a user device 200 displaying user selectable links and sponsored links 408. In FIG. 1B the user device 200 is displaying a graphical user interface (hereafter referred to as a "GUI") that includes a search engine results page (hereafter referred to as a "SERP"). In the illustrated example, the user device 200 is displaying search results 660 responsive to the search query 602 "late night diners." In response to the search query 602, the deep-linking system 100 has provided search results corresponding to two different software applications ("Restaurant Reviewer" and "Diner Hunter"). In the illustrated example, the individual search results 660 are displayed in cards 608 that are user selectable links. Put another way, if a user selects (e.g., presses on) one of the cards 608, the user device 200 can access a state of a software application identified by the card 608. In this example, the search results 660 include a first card 608a that links to a state of the Restaurant Reviewer software application where users can view reviews for a business called "Amanda's Place." The search results 660 further include a second card 608b that links to a state of the Restaurant Reviewer software application where users can view reviews for a business called "Tom's Bistro." The search results 660 also include a third card 608c that links to a state of the Diner Hunter software application where users can view information relating to a business called "Uli's." In examples where the search engine 600 utilizes the advertising engine 400, the search results 660 may include sponsored links 408. For example, the search results 660 also include a fourth card 408d that is a sponsored link 408 to a state of the Diner Hunter software application where users can view information relating to a business called "Chez Bennett." In examples where the search engine 600 includes sponsored links 408 in the search results 660, a user selectable link corresponding to a sponsored state may indicate to a user that the search result is advertised. For example, as depicted in FIG. 1B, the fourth card that represents a sponsored link 408d includes the text "Ad" in the top right corner of the card, thereby indicating to a user that the card is a sponsored search result. The search engine 600 may indicate sponsored links 408 to a user in other suitable manners, including but not limited to icons, images, symbols, and other indicators.

FIG. 1C illustrates an example of a user device 200 displaying a sponsored link 408 alongside an application state running on the user device 200. A sponsored link 408 may refer to a user selectable link that is provided by an advertising engine 400. In the illustrated example, the user device 200 is executing a native application. The native application may be configured to request sponsored links 408 from the deep-linking system 100. The deep-linking system 100 provides advertisement objects that may be rendered and displayed as sponsored links 408 in a GUI of the native application by the user device 200. Though the example sponsored link 408 of FIG. 1C is illustrated as appearing below native application content, the sponsored link 408 may also be included in other locations relative to the native application content. For example, the sponsored link 408 may be included above or to the sides of the native application content. Additionally or alternatively, the sponsored links 408 may be placed within the native application content itself.

The user selectable links of FIGS. 1B and 1C are provided for example only and are not intended to limit the scope of the disclosure. Any suitable types of user selectable links (e.g., sponsored links 408) may be implemented by the deep-linking system 100.

Figure 2:
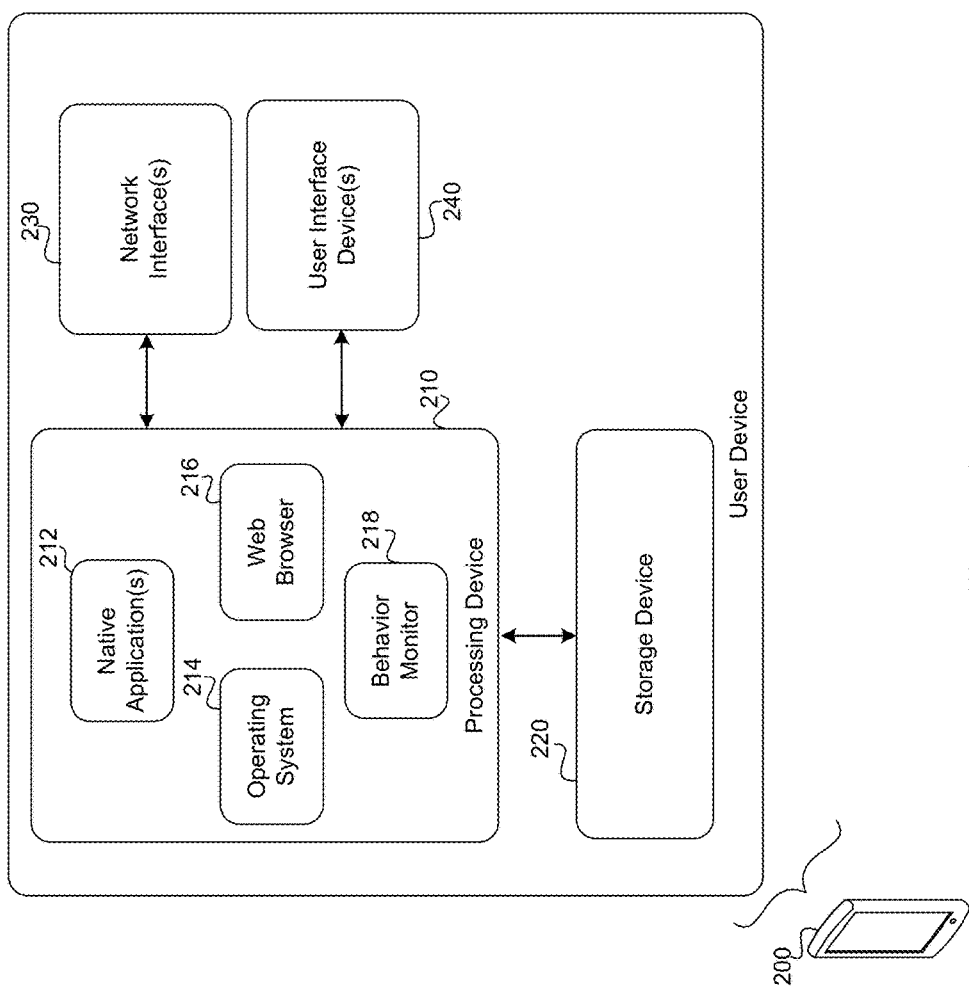
FIG. 2 is a schematic view of example components of a user device

FIG. 2 illustrates an example user device 200 and example components thereof. In the illustrated example, the user device 200 includes a processing device 210, a storage device 220, a network interface 230, and a user interface 240. The user device 200 may include additional components not shown in FIG. 2. The components of the user device 200 may be interconnected by, for example, a bus or other communication circuitry.

The processing device 210 can include one or more processors that execute computer-executable instructions and associated memory (e.g., RAM and/or ROM) that stores the computer-executable instructions. In implementations where the processing device 210 includes more than one processor, the processors can execute in a distributed or individual manner. The processing device 210 can execute an operating system 214, one or more native applications 212 (which may include a search application), a web browser 216, and/or a behavior monitor 218, all of which can be implemented as computer-readable instructions. One or more of the native applications may include a native application module 215 that communicates with the deep-linking system 100.

The storage device 220 can include one or more computer-readable mediums (e.g., hard disk drives, solid state memory drives, and/or flash memory drives). The storage device 220 can store any suitable data that is utilized by the operating system of the user device 200. The storage device 220 can be in communication with the processing device 210, such that the processing device 210 can retrieve any needed data therefrom.

The network interface 230 includes one or more devices that are configured to communicate with the network 150. The network interface 230 can include one or more transceivers for performing wired or wireless communication. Examples of the network interface 230 can include, but are not limited to, a transceiver configured to perform communications using the IEEE 802.11 wireless standard, an Ethernet port, a wireless transmitter, and a universal serial bus (USB) port.

The user interface 240 includes one or more devices that receive input from and/or provide output to a user. The user interface 240 can include, but is not limited to, a touchscreen, a display, a QWERTY keyboard, a numeric keypad, a touchpad, a microphone, and/or speakers.

The processing device 210 executes one or more native applications 212. The processing device 210 further executes a behavior monitor 218. A behavior monitor 218 is a set of computer-readable instructions that may be a standalone application or may be incorporated into the operating system 214, the web browser 216, and/or any other native applications 212. The behavior monitor 218 monitors the use of the user device 200 and generates usage data 102 based thereon. The behavior monitor 218 may execute as a background process that monitors the current state of the user device and/or monitors a user's response to a set of search results 660.

In some implementations, the behavior monitor 218 monitors the current state of the user device 200. In these implementations, the behavior monitor 218 can monitor the operation of the user device 200 to determine when the user device 200 switches to a state of a software application that is different from the current state. For example, a user may be using a movie database application to view a bio of a famous actor and may switch the state of the movie database application to a state that lists start times of newly released movies. In another example, a user may open a media streaming application and begin playing a song. In yet another example, a user may open a search application, enter a search query, and click on a search result that takes the user to a different application. In all of these examples the user device 200 switches to a different state of a native software application from a current state. The different state may be within the same software application (e.g., going from a bio of an actor of a movie to time listings of the movie) or may be across different software applications (e.g., switching from a state within a search application to a state of an unrelated software application listed in a set of search results).

Each time the user device 200 switches to a different state, the behavior monitor 218 records the transition and generates usage data 102 corresponding to the different state. In some implementations, the behavior monitor 218 determines a function ID 104 or a resource identifier of the different state. For example, if the behavior monitor 218 is integrated into the operating system 214 or an application edition corresponding to the different state, the behavior monitor can determine a resource identifier 106 indicating the different state. In another example, when the different state is accessed using a web application, the behavior monitor 218 can record the web resource identifier corresponding to the different state.

In some of the implementations where the behavior monitor 218 identifies resource identifiers 106 instead of function IDs 104, the behavior monitor 218 translates the resource identifier 106 into a function ID 104. In some examples, the behavior monitor 218 obtains custom URL schemes of various software applications (e.g., those that are installed on the user device 200). Examples of how to implement a custom URL scheme may be found at, for example, appurl.org (maintained by Quixey, Inc.) or schema.org (maintained by Google, Inc., Yahoo, Inc., Microsoft Corporation, and Yandex). The behavior monitor 218 utilizes the custom URL scheme to translate the resource identifier into a function ID 104.

In implementations where the user device executes a search application, the behavior monitor 218 can monitor the search application to determine search activity log data 108. In these implementations, the behavior monitor 218 must first receive consent from the user to begin gathering activity log data 108. For example, once the behavior monitor 218 obtains consent, the behavior monitor 218 can record search queries that the user device 200 transmits and a user's responses to the search results returned in response to search queries. For example, the behavior monitor 218 can identify the user selectable links (i.e., search results) that were selected by the user. In some implementations, a result object of a selected link, which links to a state of a software application, can include the function ID 104 of the linked-to state. Thus, when the user selects the link, the behavior monitor 218 can obtain the function ID 104 of the linked-to state. The behavior monitor 218 can record the function ID 104 and the search query in the usage data 102.

The behavior monitor 218 identifies additional information. For example, the behavior monitor 218 can determine a date or day of the week, a time, and/or geolocation of the user device 200. The behavior monitor 218 can include the additional data (e.g., an identifier of the different state, a time, a day of the week, and a geolocation) in the usage data 102 of the user device 200.

The behavior monitor 218 transmits the usage data to the analytics engine 300. Prior to transmission, the behavior monitor 218 can scrub the usage data 102 to remove any data that may be used to identify the user of the user device 200. The behavior monitor 218 can transmit the usage data 102 at each state transition or at predetermined intervals (e.g., every five minutes, every six hours, every day). In order to further protect the privacy of the user, the behavior monitor 218 may purge the collected usage data 102 from memory (e.g., from the storage device 220) each time it transmits the usage data 102 to the analytics engine 300.

Figure 3A:
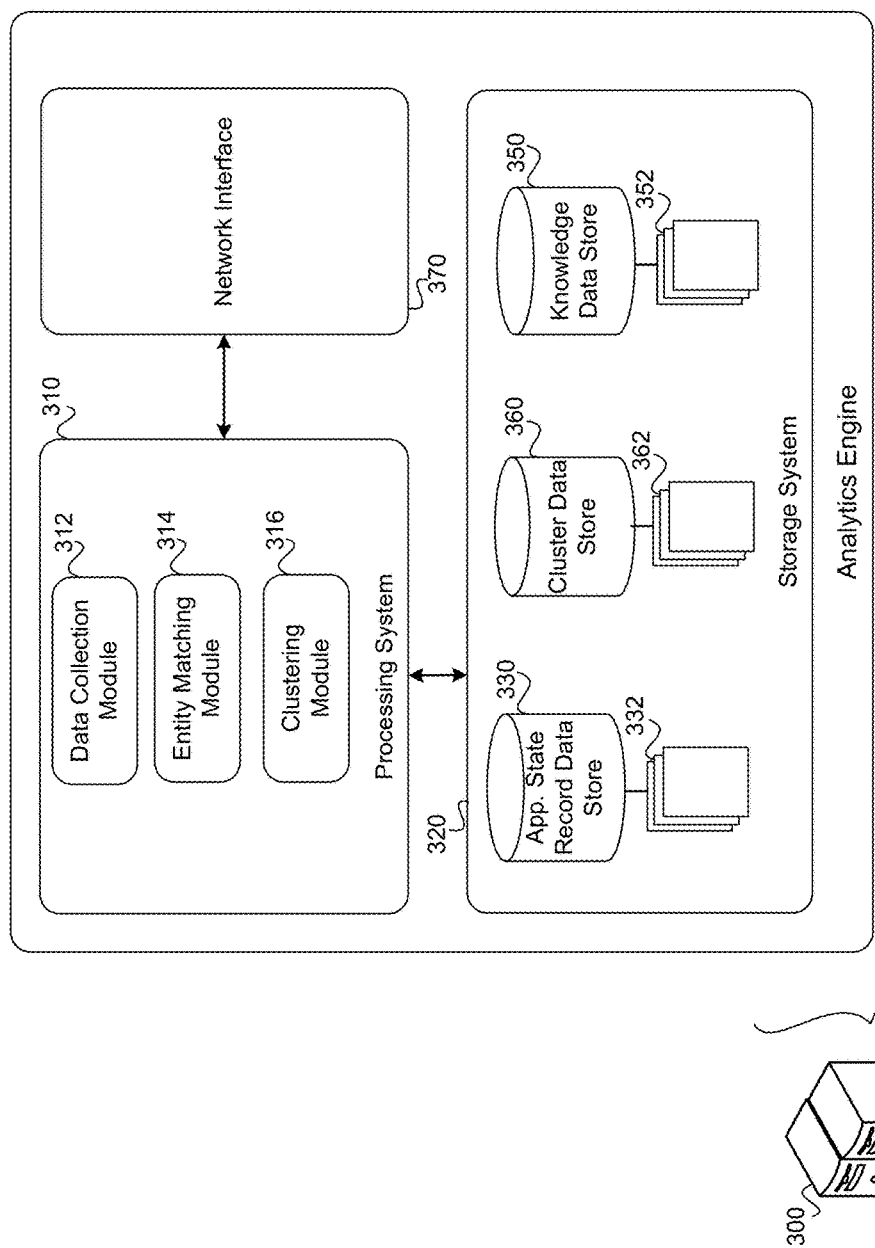
FIG. 3A is a schematic view of example components of an analytics engine.
Figure 3D:
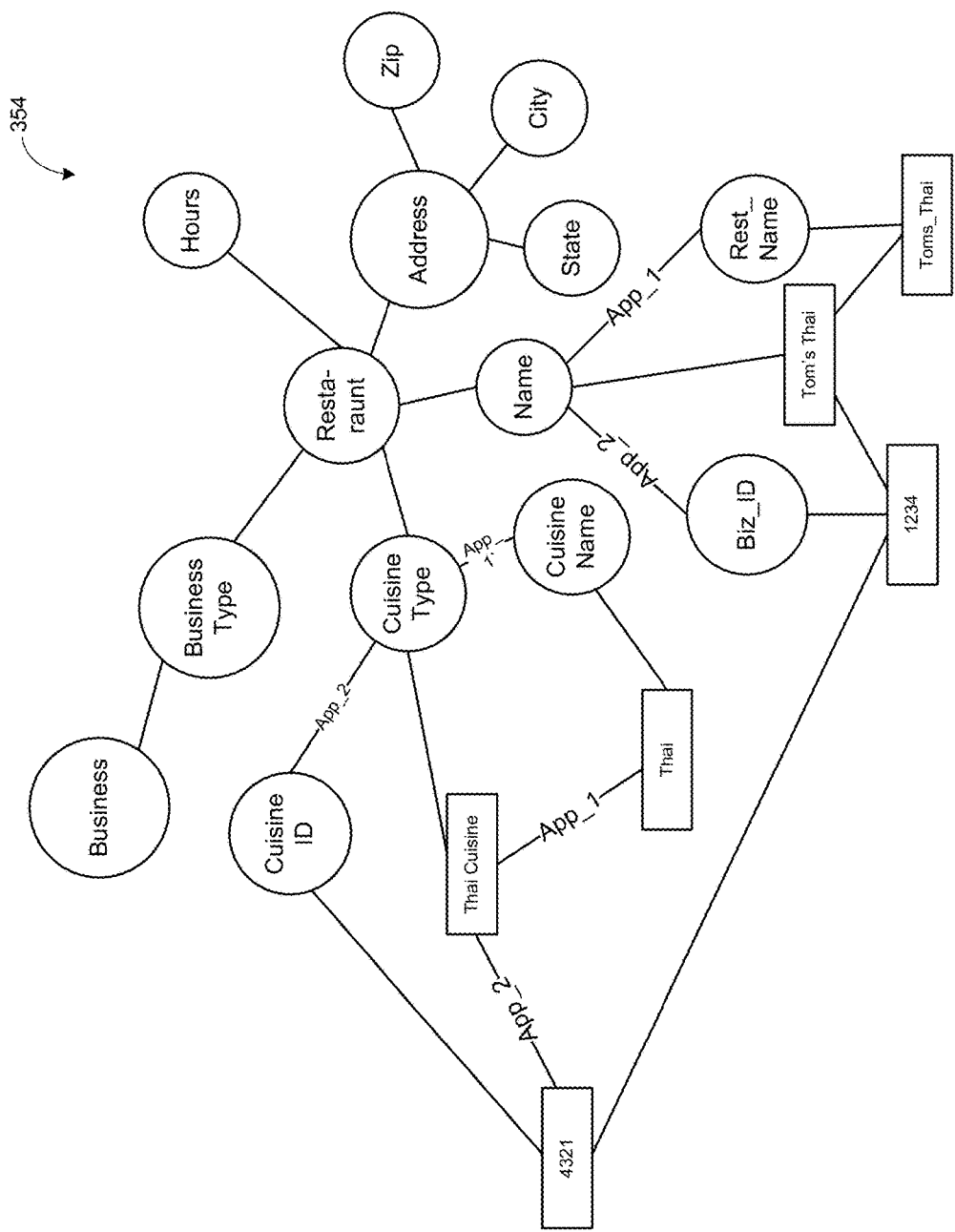
FIG. 3D is a schematic view of an example entity ontology.
Figure 3E:
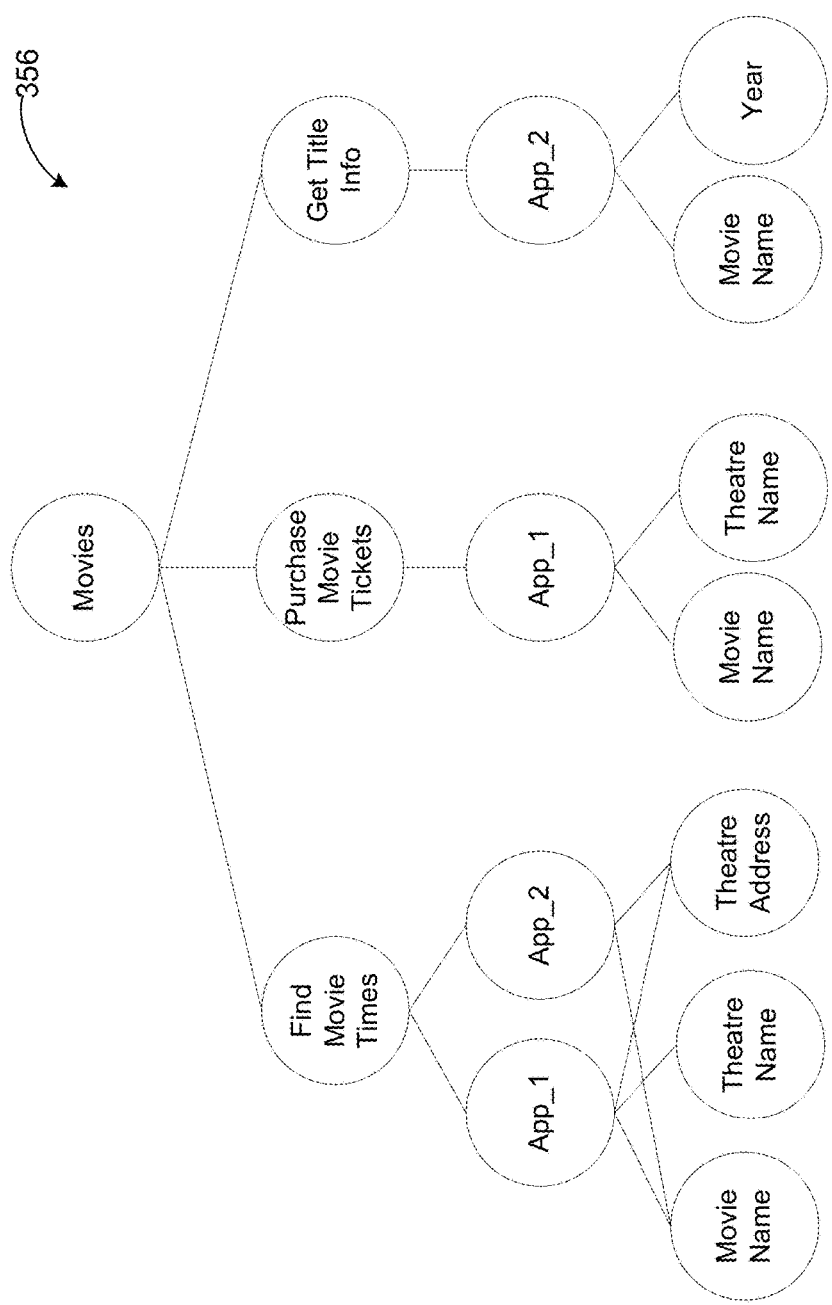
FIG. 3E is a schematic view of an example functional ontology.

FIG. 3A illustrates example components of an analytics engine 300. In the illustrated example the analytics engine 300 includes a processing system 310, a storage system 320, and a network interface 370. The analytics engine may include additional components not explicitly shown in FIG. 3A. The components of the analytics engine 300 may be interconnected, for example, by a bus and/or any other form or medium of digital data communication, e.g., a communication network 150.

The processing system 310 is a collection of one or more processors that execute computer readable instructions. In implementations having two or more processors, the two or more processors can operate in an individual or distributed manner. In these implementations, the processors may be connected via a bus and/or a network. The processors may be located in the same physical device or may be located in different physical devices. The processing system executes a data collection module 312, an entity matching module 314, and a clustering module 316.

The network interface device 370 includes one or more devices that perform wired or wireless (e.g., Wi-Fi or cellular) communication. Examples of the network interface devices include, but are not limited to, a transceiver configured to perform communications using the IEEE 802.11 wireless standard, an Ethernet port, a wireless transmitter, and a universal serial bus (USB) port.

The storage system 320 includes one or more storage devices. The storage devices may be any suitable type of computer readable mediums, including but not limited to read-only memory, solid state memory devices, hard disk memory devices, and optical disk drives. The storage devices may be connected via a bus and/or a network. Storage devices may be located at the same physical location (e.g., in the same device and/or the same data center) or may be distributed across multiple physical locations (e.g., across multiple data centers). The storage system 320 stores an application state record data store 330, a knowledge data store 350, and a cluster record data store 360. Example contents of the respective data stores 330, 350, 360 are discussed in detail below.

The application state record data store 330 includes a plurality of different application state records 332. FIG. 3B illustrates an example state record 332. Each state record 332 may include data related to a state of the software application resulting from performance of the function. In some implementations, a state record 332 includes a function identifier (ID) 104, application state information 334, entity information 336, one or more access mechanisms 338 used to access the state of the software application, and state statistics 340. The application state data store 330 may include one or more databases, indices (e.g., inverted indices), tables, files, or other data structures which may be used to implement the techniques of the present disclosure.

The function ID 104 may be used to identify the application state record 332 among the other state records 332 included in the application state data store 330. The function ID 104 may be represented in any suitable format, as described above. An application state record 332 further includes one or more access mechanisms 338. The access mechanism(s) 338 may include one or more application access mechanisms, one or more web access mechanisms, one or more application download addresses, and/or one or more scripts. A user device 200 may use the one or more application access mechanisms and the one or more web access mechanisms to access the same, state of the software application using a corresponding edition of the software application. For example, the user device 200 may use the different access mechanism(s) 338 to retrieve similar information, play the same song, or play the same movie. The application download addresses may indicate locations where the native application editions referenced in the application access mechanisms can be downloaded.

The application state information 334 may include data that describes the application state to which the record corresponds. The state of the application may be accessed by an edition of the software application using one of the access mechanisms 338 in the application state record 332. Additionally or alternatively, the application state information 334 may include data that describes the function performed according to the access mechanism(s) 338 included in the application state record 332. The application state information 334 may include a variety of different types of data. For example, the application state information 334 may include structured, semi-structured, and/or unstructured data.

In some implementations, the application state information 334 may include the content that is provided in a result object. The content corresponds to the data provided by a software application when the software application is set in the application state defined by the access mechanism(s) 338 defined in the application state record 332. The types of data included in the application state information 334 may depend on the type of information associated with the application state and the functionality defined by the access mechanism(s) 338. For example, if the application state record 332 is for an application that provides reviews of restaurants, the application state information 334 may include information (e.g., text and numbers) related to a restaurant, such as a category of the restaurant, reviews of the restaurant (e.g., textual reviews and/or a star rating), and a price rating of the restaurant. In another example, if the application state record 332 is associated with a shopping application, the application state information may include data that describes products (e.g., names, ratings, and prices) that are shown when the shopping application is set to a state defined by an access mechanism(s) 338 stored in the record 332.

The application state information 334 may further define the function performed by the software application when set to the state. The application state information 334 may include a name of an action that is performed by the software application. The application state information 334 may also define the types of parameters that the software application receives in order to access the state. For example, if a state of a software application allows a user to view a particular photograph or file, the action may be "view document" and the software application requires a filename parameter in order to access the state.

The entity information 336 defines the entities and entity types corresponding to the state of the software application defined by the application state record 332. The entities may be entities that are identified in the content corresponding to the state of the software application or entities that can be accepted by the software application when set to the state of the software application. For instance, if a state record 332 defines a state of a shopping application where a user can purchase a particular product, the entities may be a name of the product, a maker of the product, and a price of the product. In another example, the application state record 332 may correspond to a state of an airline application where a user can make flight reservations. In this example, the entities may include all known airport codes that the airline flies in and out of. The entity types may be the entity types of the entities defined in the entity information. As previously discussed an entity may have multiple entity types.

The entity information 336 may further include geographic entities relating to the state of the software application. For example, if the state of a software application refers to a restaurant in a particular city, the geographic entities may include the address, the city, the state, and/or the country of the restaurant. In another example, if the state of a software application allows a user to purchase a particular product, the geographic entity may identify countries where the product may be shipped or countries where the state of the software application may accessed. To the extent the state of the software application is not limited by geography (e.g., a level of a game), the entity information 336 may identify the state as having global relevance. The entity information 336 may further include time related information. For example, the time related entities may indicate a date of publication.

The statistics 340 can define statistics relating to the state of the software application. Examples of the statistics are the number of times the state of the software application is accessed, how often (on average) the state is accessed over a period of time (e.g., per hour or per day), the times of the day when the state is accessed, how many times the state is accessed for each day of the week, and the geolocations of the user devices when the state is accessed. The statistics can include any other additional statistics relating to the state of the software application.

The knowledge data store 350 stores a knowledge base 352. In some implementations, the knowledge base 352 includes one or more entity tables. In these implementations, an entity table is a lookup table that relates a term or combination of terms to the possible entity types of the term or combination of terms. Each relation can also have an associated entity score that is a probability value that indicates a likelihood that the term is of that entity type. The entity scores can be determined, for example, heuristically by analyzing large sets of text and documents.

The knowledge base 352 can include any other additional or alternative data structures. For example, in some implementations at least a portion the knowledge base 352 is structured in accordance with an entity ontology 354 (FIG. 3D) and/or a functional ontology (FIG. 3E). FIG. 3D illustrates an example of an entity ontology 354. The entity ontology 354 may define a formal framework for expressing relationships between different items in the knowledge base 352. The entity ontology 354 may define relationships between general entity types to app-specific entity types. For example, the "name" general entity type may relate to a "Biz ID" app-specific entity type for a first software application and "Rest_name" app-specific entity type for a second software application. In this way, the first software application's schema refers to a restaurant name as "Biz ID" and the second software application's schema refers to a restaurant name as "Rest_name." Furthermore, entity types may relate to other entity types. For example, the general entity type "Thai cuisine" may reference an "Asian cuisine" entity type as Thai cuisine may be thought of as a subclass of "Asian Food." Further, the entity type "restaurant" entity type may relate to an "address" entity type, a "cuisine" entity type, and any other relevant classifications. An "address" entity type may include a "street address" entity type, a "state" entity type, a "city" entity type, and a "zip code" entity type. The knowledge base 352 includes data points that populate the ontology. For example, the string "Thai" may be related to the "Thai cuisine," while the string "Tom's Thai" may relate to "Thai cuisine" entity type and "restaurants" entity type. As the analytics engine 300 learns about new entities, the analytics engine 300 can connect the new entity to its corresponding entity types. In this way, the knowledge base 352 indicates how an entity relates to other entities and the entity type(s) of the entity given the entity ontology 354. For instance, the entity "Tom's Thai" may be linked to a state entity "California," a city entity "Mountain View," and a zip code entity "94040." Furthermore, as the ontology also includes app-specific entities, the analytics engine 300 is able to represent the restaurant name "Tom's Thai" in a manner that is understood by third party applications (e.g., "1234" for a first application and "Toms_Thai" for a second application). In some implementations, the ontology and its corresponding data points (i.e., the specific entities) may be indexed and stored in the knowledge base 352. For example, the analytics engine 300 may index the ontology and corresponding data points into one or more entity tables. In these implementations, components of the analytics engine 300 can query the entity tables with a query term, and if the query term (or combination of query terms) is listed in the entity table as an entity, the entity table returns to potential entity type(s) of the query term (or query terms).

FIG. 3E illustrates an example of a portion of a knowledge base 352 that is structured according to a functional ontology 356. A functional ontology can define the relationships between known verticals, functions that support the vertical, the software applications that perform those functions, and the entity types that the software applications require in order to perform the function. The example of FIG. 3E relates to a vertical focused on movies. Typical functions relating to movies are purchasing movie tickets, finding listings of times a movie is playing, finding information about the title, streaming a movie, finding reviews of a movie, and finding information on actors and actresses. In the illustrated example, the knowledge base identifies purchasing movie tickets, finding listings of times a movie is playing, finding information of the title as possible functions associated with the movie vertical. A first software application (App_1) and a second software application (App_2) can be used to find movie times. The first software application can also be used to purchase tickets and the second software application can be used to get information about a movie. According to the knowledge base 352 the first software application requires a movie name entity, a theatre name entity, and an address entity in order to perform the purchase movie tickets function. Further, the knowledge base 352 indicates that the second software application requires a movie name entity and an address to perform the purchase movie tickets function. The example of FIG. 3E is a simplified example of the movie vertical. The functional ontology 356 may include any number of verticals and any number of functions defined therein. Furthermore, the functional ontology 356 may be structured in other suitable manners.

The cluster data store 360 stores cluster records 362. Each cluster record 362 relates to a unique cluster 110 identified by the analytics engine 300. FIG. 3C illustrates an example of a cluster record 362. A cluster record may include a cluster ID 364, function ID data 366, and feature information 368.

A cluster ID 364 may be a string made up of letters, numbers, and/or characters that identify a cluster 110 from other clusters 110. The cluster ID 364 may be a random value (a random arrangement of letters and numbers) or a human understandable value (e.g., a name of the cluster). As will be discussed, when the clustering module 316 identifies a new cluster 110, the clustering module 316 can create a new cluster record 362 and can assign a new cluster ID 364 to the new cluster record 362.

The function ID data 366 identifies the states of the software application that belong to the cluster. The states of the software applications may be represented by function IDs 104. Thus, the function ID data 366 can define the function IDs that were included in the cluster 110 corresponding to the cluster record 362.

The feature information 368 identifies the features that were used to identify the cluster 110 corresponding to the cluster record 362. As will be discussed, the clustering module 316 can cluster states of applications based on different features. For example, when advertising a state of an application, functional features and entities defined by the state may be relevant, but statistics that tend to show popularity may not be relevant. In this example, some clusters 110 may be clustered based on whether an application contains a relevant function or associated entity. Thus, the feature information 368 can define the features that were used to identify the cluster 110 defined by the cluster record 362.

The data collection module 312 receives usage data 102 from a plurality of user devices 200. In some implementations, the data collection module 312 generates and/or updates state records 332 based on the usage data 102. When the data collection module 312 receives usage data 102 from a user device 200, the data collection module 312 identifies one or more states of one or more software applications accessed by a user device 200. As previously discussed, the state of the software application may be represented in the usage data 102 by a function ID 104 or a resource identifier 106. In the case that the state is represented by a resource identifier 106, the data collection module 312 can translate the resource identifier 106 to a function ID 104 using the custom URL scheme of the software application to which the resource identifier 106 corresponds.

For each state of a software application identified in the usage data 102, the data collection module 312 determines whether the application state data store 330 includes a state record 332 corresponding to the state. For instance, the data collection module 312 can search the application state record data store 330 using the function ID 104 representing a particular state. If the data collection module 312 finds a state record 332 corresponding to the function ID 104, the data collection module 312 can update the statistics 340 of the application state record 332 with information contained in the usage data 102. For instance, the data collection module 312 can increment a total number of times that the state was accessed, can indicate a time that the state was accessed, a geolocation from which the state was accessed, and a day of the week that the state was accessed.

In the event that the data collection module 312 does not find a state record 332 corresponding to a function ID 104, the data collection module 312 can create a state record 332 corresponding to the state of the software application represented by the function ID 104. The data collection module 312 can create a new state record 332. The data collection module 312 can further instruct a crawler (not shown) to crawl the software application at the given state, so as to identify the application state information 334 and the access mechanisms used to access the state. The data collection module 312 can also update the statistics of the new application state record 332 in the manner described above.

In the event the data collection module 312 creates a new state record 332, the entity matching module 314 can identify the ontological features of the new state record 332. In some implementations, the entity matching module 314 obtains ontological features corresponding to the function ID 104 provided by data collection module 312. Ontological features can include entity features and functional features. An entity feature identifies entities that are relevant to the state and the entity types thereof. For example, if a function ID corresponds to a software application that, amongst other functions, allows users to view photos of food, the entity features may include a name of the restaurant, a name of the dish, or a type of cuisine. The entity matching module 314 can utilize the portion of the knowledge base 352 organized according to the entity ontology 354 to identify the entity features and the portion of the knowledge base 352 organized according to the function ontology 356 to identify the functional features. The entity matching module 314 can also fetch other features pertaining to the function ID. The entity matching module 314 can store the identified ontological features in the application state record 332.

The clustering module 316 identifies clusters 110 of states of software applications and generates/updates cluster records 362 based thereon. Identifying clusters 110 of states of software applications can refer to the clustering of application state records 332 and/or of function IDs 104 defined in the application state records 332 based on one or more features defined in the application state records 332. A developer (e.g., a developer of the advertising engine 400) can define a set of features on which to cluster the states (e.g., function IDs 104). For instance, a developer wishing to identify the most popular restaurants in an area can define the following set of features on which to cluster the states: business type, number of accesses over a given period of time, and geographic location. In this example, the clustering module 316 can cluster the states based on these features to identify a plurality of clusters 110. One of the clusters 110 may include function IDs 104 corresponding to states of software applications that relate to restaurants that are popular and within a specific geographic region. Furthermore, states of software applications that do not relate to restaurants may be clustered together in a non-relevant cluster 110. In another example, a developer may want to identify states of applications that correspond to similar actions. In this example, the developer can define the following set of features: action type and entity types. In this example, function IDs 104 corresponding to similar actions and/or states that receive or define similar entity types may reside in the same clusters 110. A developer can select any set of features on which to cluster the states of the software applications. The clustering module 316 can be configured to perform any suitable clustering algorithm. Examples of clustering algorithms include, but are not limited to, k-means clustering, bi-clustering, tri-clustering, and k-nearest neighbors.

In operation the clustering module 316 receives a set of feature types. The clustering module 316 then clusters the function IDs 104 based on the feature types. The result of the clustering is one or more clusters 110. For each cluster 110 identified by the clustering module 316, the clustering module 316 generates a cluster record 362 corresponding to the cluster 110. The clustering module 316 may assign a cluster ID 364 to the cluster record 362. The cluster ID 364 may be any suitable value. In some implementations, the clustering module 316 increments a counter each time it identifies a new cluster 110 and uses the new counter value as the cluster ID 364.

The function ID data 366 defines the membership of the cluster 110. The clustering module 316 includes the function IDs 104 of the application state records 332 that were grouped in the identified cluster 110 in the function ID data 366 of the cluster record 362. In this way, the function ID data 366 identifies which application state records 332 belong to a particular cluster 110.

The clustering module 316 further includes the feature types that were used to identify the cluster 110 in the feature information 368 of the cluster record 362. In this way, the feature information 368 indicates the features that were used to identify the cluster 110.

Each time the clustering module 316 is called, the clustering module 316 can identify new clusters 110 of function records 332 and/or update preexisting clusters 110. For example, when the clustering module 316 receives a set of feature types that it has not yet clustered, the clusters 110 resulting from the clustering on the new set of feature types are new clusters. In such a situation, the clustering module 316 identifies new clusters 110 and, therefore, generates new cluster records 362. In the event that the clustering module 316 is operating with a previously used set of feature types, the clustering module 316 may identify new members of preexisting clusters 110 (e.g., newly discovered states of software applications and/or states of software applications whose features have changed over time) or may identify clusters 110 with new members altogether. In the former scenario, the clustering module 316 may update clusters 110 that are previously identified clusters 110 with new members (e.g., newly discovered states of software applications and/or states of software applications whose features have changed over time). In the latter scenario, the clustering module 316 may identify one or more new clusters 110 all while updating one or more preexisting clusters 110.

The cluster records 362 identified by the analytics engine 300 can be used for many suitable applications. In some implementations, the cluster records 362 can be used by the advertising engine 400 to improve the targeting of sponsored links 408 (i.e., increase the relevance of sponsored links 408) to a user.

Figure 4A:
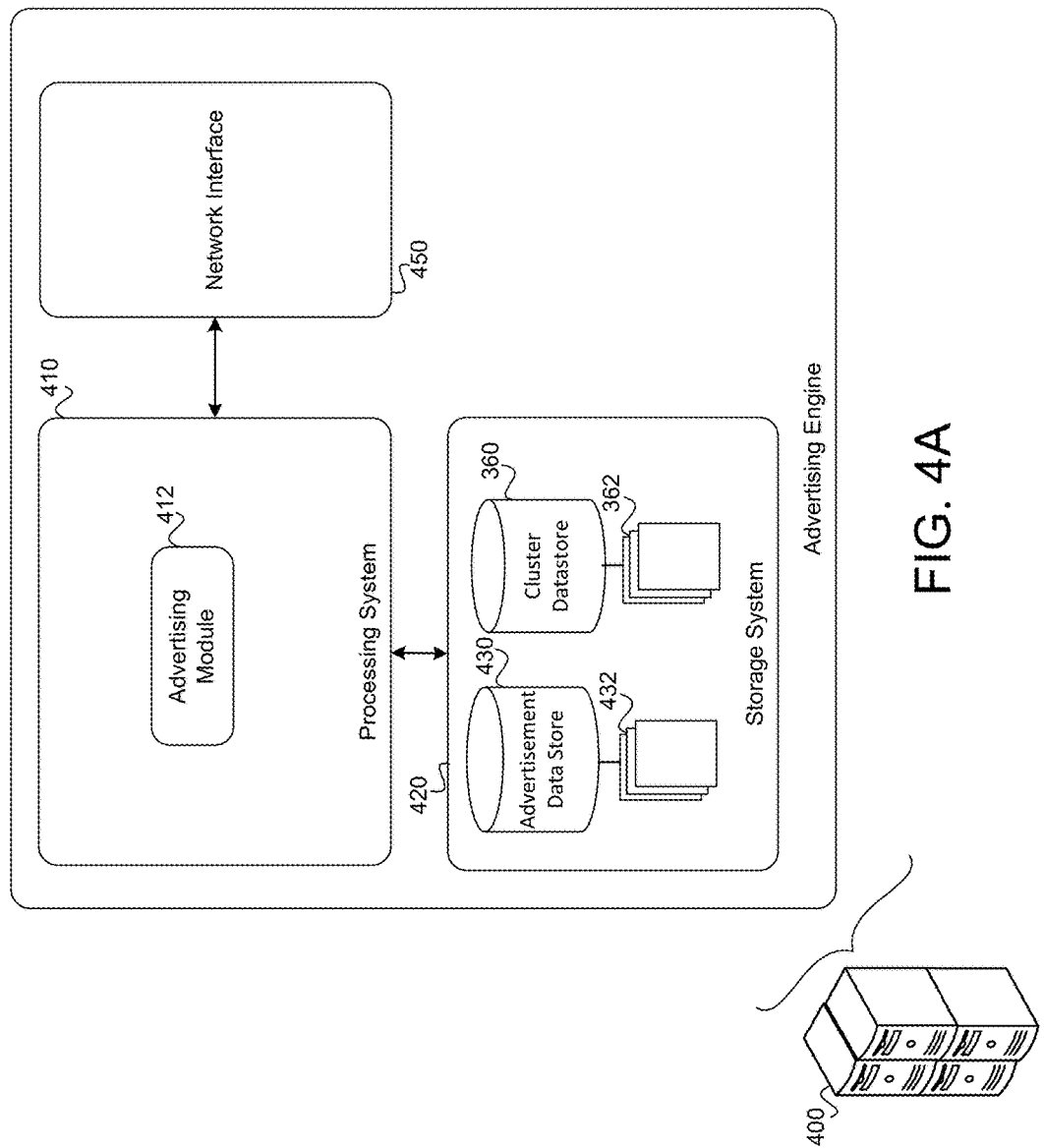
FIG. 4A is a schematic view of example components of an advertising engine.

FIG. 4A illustrates an example advertising engine 400 according to some implementations of the present disclosure. In the illustrated example, the advertising engine 400 includes a processing system 410, a storage system 420, and a network interface 450. The processing system 410, storage system 420, and network interface 450 of the advertising engine 400 may be substantially similar to those of the analytics engine 300. In some instances, one or more of the components may be shared amongst the advertising engine 400, search engine 600, the analytics engine 300, and/or any other engines of the deep linking system 100. The processing system 410 executes an advertising module 412. The advertising module 412 accesses the cluster data store 360 and an advertisement data store 430.

In operation, the advertising module 412 receives advertisement requests 602 from a user device 200 and/or the search engine 600 and provides advertisement objects in response to the advertisement requests 602. The advertising module 412 generates advertisement objects based on advertisement records 432 included in the advertisement data store 430. The advertising module 412 transmits the advertisement objects to a requesting device (e.g., a user device 200 and/or search engine 600), which may use the advertisement object(s) to generate sponsored link(s) 408. An advertisement request 402 may include any suitable information that the advertising module 412 can utilize to select a sponsored link 408 (e.g., an advertisement record 432) to present to a user. For instance, an advertisement request 402 received from the search engine 600 may include a search query 602 (or tokens representing the search query 602 after the processing thereof). In some implementations, the advertisement request 402 received from the search engine 600 may also include the search results 660 that the search engine 600 determined in response to the search query 602. The advertising module 412 utilizes the search results 660 to determine which sponsored links 408 to display to a user based, in part, on the clusters 110 to which the individual application states of the search results belong. The advertisement request 402 may be provided with context parameters 604 as well. The context parameters 604 correspond to the user device 200 that provided the advertisement request 402 and/or the search query 602 that resulted in the search engine 600 providing the search results 660. In other examples, the advertising engine 400 may receive an advertisement request 402 from a user device 200, whereby the advertisement request 402 may include a function ID 104 indicating a current state of the user device 200. In such examples, the advertising module 412 utilizes the function ID 104 included in the advertisement request 402 to determine which sponsored links 408 to display to a user based, in part, on the clusters 110 to which the current state of the user device 200 belongs.

The advertising module 412 retrieves advertisement records 432 from the advertisement data store 430 using the contents of the advertisement request 402. The advertising module 412 identifies advertisement records 432 that correspond to the contents of the advertisement request 402, and generates one or more advertisement objects based on the identified advertisement records 432.

Figure 4B:
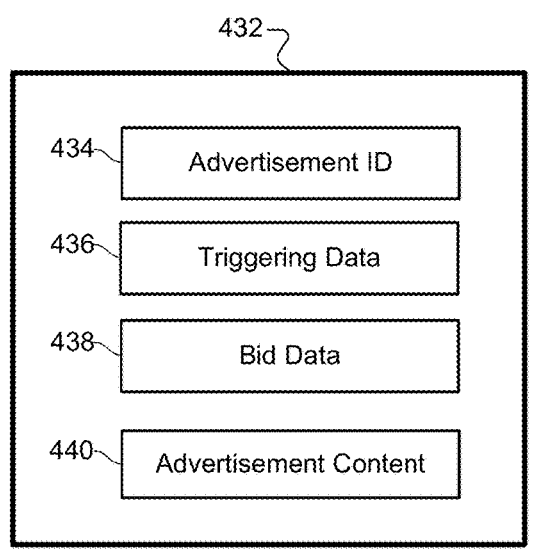
FIG. 4B is a schematic view of an example advertisement record.

FIG. 4B illustrates an example of an advertisement record 432. The advertisement data store 430 may further include one or more indexes that associate keywords, combinations of keywords, entities, or entity types to specific advertisement records 432 based on a correspondence there-between. An example advertisement record 432 may include, but is not limited to, an advertisement ID 434, triggering data 436, bid data 438, and advertisement content 440. The advertisement data store 430 may store a plurality of the advertisement records 432.

The advertisement ID 434 may be any string that identifies the advertisement record 432 from the other advertisement records. In some implementations, the advertisement ID 434 is a function ID 104, whereby the advertisement ID 434 corresponds to a sponsored state of a software application. A sponsored state of a software application can refer to a state of a software application where an advertiser has agreed to a pay a certain amount of money in exchange for an action (e.g., click, impression, or purchase). The advertisement ID 434 may be structured in any suitable manner.

The triggering data 436 is any data that the advertising module 412 utilizes to determine whether the advertisement record 432 is relevant to the content of an advertisement request 402. Examples of triggering data 436 may include, but are not limited to, function IDs, keywords, entities, entity types, and/or types of applications. Triggering data may be manually provided by an advertiser of an application state or may be automatically generated by the advertising engine 400 based on usage data related to the sponsored application state. Advertisement records may be triggered based on matches between items defined in an advertisement request 402 and items included in triggering data 436.

The bid data 438 represents the amount the advertiser has agreed to pay per the agreed upon actions as well as any other restrictions with respect to the agreement. The amount can be a numerical value that indicates the amount the advertiser agrees to pay when an action surrounding a sponsored link 408 generated based on the advertisement record 432 occurs. Examples of actions can be an impression (e.g., the sponsored link 408 is shown), a click (e.g., a user selects the sponsored link 408), or a sale (e.g., the user has completed a transaction in response to the sponsored link 408). The restrictions define conditions that need to occur in order for the sponsored link 408 to be presented to the user. For example, the restrictions may include monetary restrictions and geographic restrictions. A monetary restriction may refer to an upper limit of money that the advertiser agrees to pay over a given period of time (e.g., a daily or weekly budget). For example, the advertiser may agree only to pay up to $1000.00 a day for a particular sponsored link 408. A geographic restriction may refer to a geographic region that the advertiser wishes to advertise in. Thus, when an advertisement request 402 corresponds to a region not defined in the geographic restriction, the advertising engine 400 may exclude such a sponsored link 408 from being presented to the user. Another restriction may be a list of application states (e.g., function IDs) with which a sponsored link 408 based on the advertisement record 432 may not be displayed. For example, a developer or third party advertiser of a sponsored application state may not wish to provide sponsored links 408 alongside or within an application state associated with a competitor. Another example of a restriction may be a time frame indicating a time of day during which a sponsored link 408 based on the advertisement record 432 may or may not be displayed. The restrictions may include any additional or alternative restrictions.

In some implementations, the advertising module 412 receives an advertisement request 402 from a user device 200 or search engine 600 and generates sponsored links 408 (e.g., using one or more advertisement objects) based on the advertisement request 402. In implementations where the advertising module 412 receives an advertisement request 402 from a user device 200, the advertisement request 402 may contain the function ID of the state currently being accessed by the user device 200. In implementations where the advertising module 412 receives an advertisement request 402 from a search engine 600, the request 602 can indicate a search query 602 and/or one or more function IDs 104 (e.g., function IDs 104 corresponding to a set of search results 660) that the search engine 600 determined in response to the search query 602. For example, the advertisement request 402 may include the query terms of the search query 602 and/or function IDs 104 representing the individual search results generated in response to the search query 602. The advertising module 412 may utilize the function IDs 104 of the search results 660 identified by the search engine 600, or the function ID 104 of the state currently being accessed by the user device 200, to identify advertisement records 432.

In some implementations, the advertising module 412 may retrieve advertisement records 432 based on the function IDs 104 and/or other data included in the advertisement request 402. In one example, the advertising module 412 searches the advertisement data store 430 for advertisement records 432 that include function IDs 104 in the triggering data 436 that match a function ID 104 received in the advertisement request 402. In another example, the advertising module 412 searches the advertisement data store 430 for advertisement records 432 that include terms in the advertisement request 402 that match to keywords indicated in the triggering data 436 of the advertisement records 432. Application records 432 containing triggering data 436 indicated by the advertisement request 402 (e.g., one or more keywords or function ID 104s match) may be identified by the advertising module 412 as potential sponsored links 408 (hereafter "triggered advertisement records"). In some implementations, the advertising module 412 may generate advertisement objects based on the triggered advertisement records and transmit the advertisement objects to a requesting device (e.g., a user device 200 or a search engine 600). In some examples, the advertisement request 402 may request fewer sponsored links 408 than the number of triggered advertisement records. The advertising module 412 may be configured to select a number of triggered advertisement records corresponding to the number of sponsored links 408 requested in the advertisement request 402. In some implementations, the advertising module 412 may communicate with the cluster data store 360 to access clusters associated with the triggered advertisement records 432.

The advertising module 412 may be configured to select between advertisement records 432 using a variety of techniques. In some implementations, the advertising module 412 may select between triggered advertisement records 432 based on clusters containing the underlying application state (i.e., function ID) included in an advertisement record 432 and also containing one or more function IDs of the advertisement request 402. A cluster 110 including one or more application states (i.e., function IDs) of an advertisement request and an underlying application state of an advertisement record 432 may hereafter be referred to as a triggered cluster. The advertising module 412 may identify a triggered cluster associated with each triggered advertisement record. For instance, the advertising module 412 may search the advertisement data store 430 using the function ID 410 of the advertisement record 432 (e.g., query an inverted index that indexes cluster records 340 by function IDs).

In some implementations, the advertising module 412 may utilize machine-learned scoring models to generate advertisement scores for each triggered advertisement record based on features of the advertisement request 402, the triggered advertisement record 432 itself, and/or the triggered advertisement record's corresponding triggered clusters. The features may be used to generate a feature vector, whereby each element of the feature vector may be a value (e.g., a binary value or numeric value) indicating features of an advertisement request, an advertisement record 432, and/or one or more triggered clusters. For example, the features may include the number of clusters that are triggered by the advertisement record 432 and/or a cluster ID of each triggered cluster. Another feature may be the number of application states appearing in (i.e., the size of) a triggered cluster. As another example, the advertising module 412 may include features of the bid data 438, such as an amount to be paid upon selection of corresponding sponsored link 408. The advertising module 412 may input a feature vector corresponding to each advertisement record 432 into a machine-learned scoring model in order to determine advertisement scores for each advertisement record 432. The advertising module 412 may select the N highest-scoring advertisement records 432, where N is a number of requested sponsored links 408 included in the advertisement request 402.

The machine-learned scoring models may be configured to maximize the expected value to be received from selecting on a sponsored link 408. In another example, the machine-learned scoring models may be configured to maximize relevance, popularity, or any suitable metric related to the application states appearing in triggered clusters. In this way, the advertising module 412 can leverage user engagement to improve the relevance of the sponsored links 408 generated based on the triggered advertisement records. For example, the behavior monitor 218 on the user devices 200 can monitor users' response to a sponsored link 408 in order to report which sponsored links 408 are selected by users and which sponsored links 408 are ignored by users. In this way, user engagement with a sponsored link can provide the scoring models appropriate signals with respect to a valid cluster choice and thereby helps tune advertisement scores. The machine-learned scoring models may be trained with this information to improve the relevance of advertisements. For example, the scoring models can learn which advertisements are relevant (e.g., ignored by users) given the context surrounding the inclusion of the advertisement (e.g., search query 602, location of the user, time of day, etc.). By identifying relevant clusters (e.g., triggered clusters) before selecting the advertisement records 432 (i.e., triggered advertisement records), the advertising module 412 can take into account important features of the states that improve the expected value of the advertisement selection. In some implementations, the machine-learned scoring models are binary decision trees.

In one example, a user may have entered a search query 602 "Chinese food" into a search application 212 running on the user device 200. In this example, the search application 212 may transmit an advertisement request 402 to the advertising engine 400 based on the search query 602. The advertisement request 402 may trigger several advertisement records 432 that are associated with the search query 602. In this example, the triggered advertisement records may correspond to a first sponsored state of a restaurant reservation application that allows users to make reservations to a particular Chinese restaurant and a second sponsored state of a food photograph application that allows users to view a photo of a popular dish from a particular Chinese restaurant. In this example, the search query 602 may have been at 9:00 AM. Based on the time of the search query, the advertising module 412 may identify triggered clusters that correspond to states that are popular in the mornings. The first sponsored state may be a member of a cluster that defines relatively popular application states. The second sponsored state may appear in a second cluster containing application states that are not as popular. The advertising module 412 may then generate feature vectors corresponding to the respective states and may input the feature vectors into a machine-learned scoring model. An example set of features may include the time of the advertisement request 402, features of the triggered clusters (e.g., cluster IDs and/or popularity of each the triggered cluster), and the bid data. In this example, the triggered advertisement record corresponding to the first sponsored state may be assigned a relatively higher advertisement score than the advertisement record corresponding to the second sponsored state based on the machine-learned scoring model, provided that the data used to train the machine-learned model indicates that the first sponsored state is likely to generate more revenue. The machine-learned scoring models may therefore provide a lower advertisement score for the advertisement record 432 of the second sponsored state. Thus, the advertising module 412 may select the first sponsored state over the second sponsored state, as the advertisement scores associated with the triggered clusters of the first and second sponsored states indicate that users are more likely to select a link to the first sponsored state over a link to the second sponsored state.

The advertising module 412 generates sponsored links 408 based on the selected triggered advertisement records. For each selected triggered advertisement record, which may be represented by an advertisement ID 634, the advertising module 412 retrieves a corresponding application state record 332 from the analytics engine 300. In some implementations, the advertisement IDs 634 of the advertisement records 432 may be identical to the function IDs 104 of their corresponding application states. In other implementations, the advertisement IDs 434 of the advertisement records 432 may be translated to the appropriate function IDs 104 using a hash function, lookup table, or other any other suitable method for maintaining the relationships between corresponding advertisement IDs 434 and function IDs 104. For each retrieved advertisement record 432, the advertising module 412 generates advertisement objects based on the advertisement content 440 contained in the retrieved advertisement record 432. For example, for each advertisement record 432 the advertising module 412 can obtain a textual description of the sponsored state, a file containing an image of an icon of the sponsored state, and/or any other suitable information that will allow the requesting device to render and display the advertisement object in a boundary (e.g., a "view") containing a user-selectable link along with text and/or images related to the link. For example, the advertising module 412 can encode the sponsored link in a container, such as a HTML document or JSON object. In this way, an advertisement object may be displayed in a manner that includes a sponsored link 408 within a graphical boundary containing other text and/or images related to the link. The advertising module 412 can output the generated advertisement objects to the requesting user device, which can then render and display sponsored links 408 within search results 660 or within a native application based on the generated advertisement objects.

Figure 5:
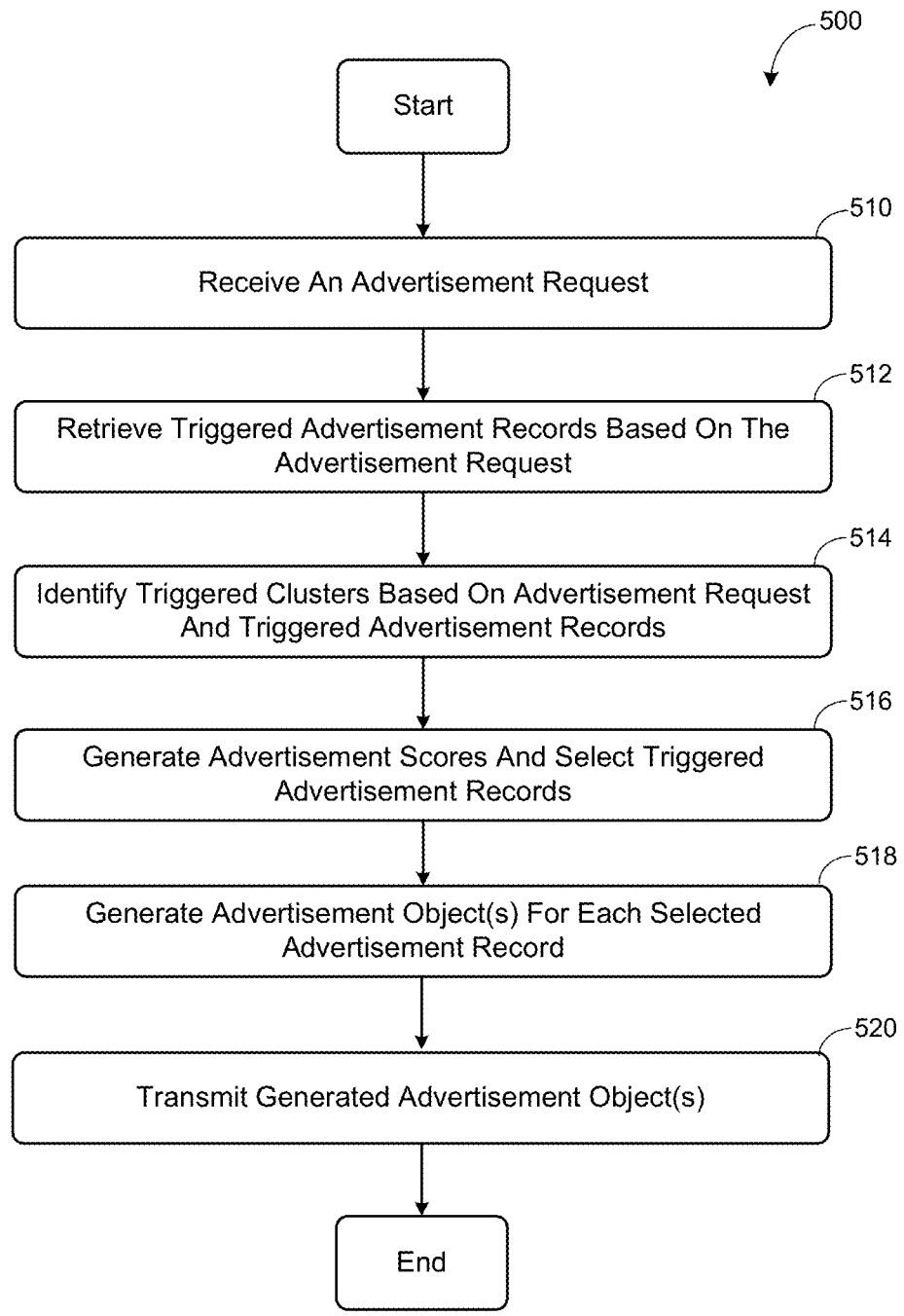
FIG. 5 is a flow chart illustrating an example set of operations of a method for processing an advertisement request.

FIG. 5 illustrates an example set of operations of a method 500 for processing an advertisement request 402 using functional clusters. For purposes of explanation, the method 500 is explained with respect to the advertising engine 400 of FIG. 4A and is executed by the processing system 410 thereof. The method 500 may, however, be executed on any suitable computing device.

At operation 510, the advertising engine 400 receives an advertisement request 402 from a user device 200, a search engine 600, or any other suitable device. The advertisement request 402 may include any suitable information that the advertising module 412 can utilize to select a sponsored link 408 to present to a user. In some implementations, the advertising module 412 receives an advertisement request 402 from a user device 200. In this example, the advertisement request 402 may indicate the function ID of the state currently being accessed by the user device 200. In another implementations, the advertising module 412 receives an advertisement request from a search engine 400. In this example, the advertisement request 402 may indicate a search query and/or the function IDs 104 of application states appearing in a set of search results 660.

At operation 512, the advertising module 412 retrieves advertisement records 432 based on the advertisement request 402. In other words, the advertising module 412 retrieves triggered advertisement records. For example, in the case where a search engine 400 transmits an advertisement request 402 indicating the function IDs 104 of a set of a search results, the advertisement module 412 retrieves advertisement records 432 with triggering data 436 that indicates one or more of the function IDs 104 of the advertisement request 402. Additionally or alternatively, the advertising module 412 retrieves advertisement records 432 that correspond to the search query included in the advertisement request 402. In another example, such as in the case where a user device 200 transmits an advertisement request 402 indicating a single function ID 104 of the state currently being accessed by the user device 200, the advertisement module 412 retrieves advertisement records 432 with triggering data 436 that indicates the function ID 104 of the current state.

At operation 514, the advertising module 412 identifies a triggered cluster associated with each triggered advertisement record. A triggered cluster may be a cluster containing the one or more function IDs 104 of the advertisement request 402 and also the function ID 104 corresponding to a triggered advertisement record.

At operation 516, the advertising module 412 generates advertisement scores for each advertisement record 432 and selects which triggered advertisement records will be used to generate advertisement objects to send to a requesting device. An advertisement score may be a value reflecting the features of a cluster with respect to the sponsored states appearing in the cluster. For example, a higher advertisement score may indicate that a triggered cluster contains highly popular sponsored states. An advertisement score may be generated using a feature vector and a machine-learned scoring model. A feature vector may incorporate any features of an advertisement request 402, an advertisement record 432, and/or its triggered cluster. The features may include but are not limited to, the bid data 438 of an advertisement record 432, the size of its triggered clusters, the popularity of its triggered clusters, the total number of triggered clusters, the time of day, the location of the user device, and/or a location associated with the triggered clusters. In some implementations, a machine-learned scoring model may leverage usage data indicating the relative popularity of sponsored states appearing in a triggered cluster to generate advertisement scores. In some implementations, a machine-learned scoring model may be tailored to maximize the expected value from displaying a sponsored link 408 based on a triggered advertisement record. In some implementations, a machine-learned scoring model may be configured to calculate the relevance of a triggered cluster to an advertisement request 402. In these implementations, the advertising module 412 may select the triggered advertisement records with the N-highest advertisement scores, where N is a number of sponsored links 408 requested by an advertisement request 402.

At operation 518, the advertising module 412 generates link objects (e.g., advertisement objects) for each selected advertisement record 432. The advertising module 412 may generate advertisement objects based on the advertisement content 440 of the selected advertisement records 432. In some implementations, the advertising module 412 may additionally retrieve application state records 332 corresponding to the selected advertisement records 432 from the analytics engine 300. The advertising module 412 retrieves the corresponding application state records 332 using the advertisement IDs 434 of the selected advertisement records 432. In some implementations, the advertisement IDs 434 of the selected advertisement records 432 are identical to the function IDs 104 of their underlying sponsored state. In other implementations, the advertisement IDs 434 of the advertisement records 432 can correspond to function IDs 104 based on a hash function, lookup table, or any other suitable vehicle for storing the relationships between advertisement IDs 434 and function IDs 104. In these implementations, the advertising module 412 may additionally include data from the retrieved application state records 332 in the advertisement objects.

At operation 520, the advertising module 412 transmits the advertisement objects to the requesting device which can then render and display the result objects as sponsored links 408 with a set of search results 660 or with native application content as depicted by FIGS. 1B and 1C. The method 500 of FIG. 5 is provided for example only and not intended to limit the scope of the disclosure. An advertising engine 400 may provide sponsored links 408 (i.e., advertisement objects) that utilize the cluster records 362 in other suitable manners as well without departing from the scope of the disclosure.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus," "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. An electronic device configured to improve relevancy of sponsored links, the electronic device comprising:
a storage that stores:
a plurality of advertisement records, each advertisement record including a sponsored state identifier identifying a state of a software application, bid data indicating a value in association with a sponsored link, and triggering data including one or more application state identifiers; and
a plurality of cluster records, each of the plurality of cluster records including clustered state identifiers, each clustered state identifier corresponding to the sponsored state identifier; and
a processor that executes computer-readable instructions, the computer-readable instructions, when executed by the processor, causing the processor to:
receive an advertisement request, the advertisement request containing at least one application state identifier;
identify at least one advertisement record from the plurality of advertisement records based on the advertisement request including the at least one application state identifier;
for each identified advertisement record:
identify at least one cluster record from the plurality of cluster records based on a sponsored state identifier in the identified advertisement record; and
identify an advertisement score for the identified advertisement record indicated by the identified at least cluster record, wherein the advertisement score is identified based on at least one of the sponsored state identifier in the identified advertisement record or bid data in the identified advertisement record;
select an advertisement record of the identified at least one advertisement record based on advertisement scores for the at least one identified advertisement record;
obtain at least one sponsored link based on the selected advertisement record; and
transmit the at least one sponsored link to a remote device for display.

2. The electronic device of claim 1,
wherein the storage further stores a plurality of application records, each application record including each of the state identifiers,
wherein each application record further includes application state information indicating content corresponding to data provided by a software application when a software program is set in an application state indicated by an application state record, and
wherein a state identifier comprises at least one of a function identifier, a resource identifier, and/or an application access mechanism.

3. The electronic device of claim 2, wherein the plurality of cluster records are identified based on usage data collected from a plurality of user devices, the usage data indicating states of software applications accessed by users of the user devices.

4. The electronic device of claim 3, wherein at least a subset of the plurality of cluster records include at least one clustered state identifier, each clustered state identifier corresponding to at least one of a popularity feature, a geography feature, or one or more entity features.

5. The electronic device of claim 1, wherein the each advertisement record includes triggering data indicating data that triggers the each of the advertisement record,
the processor executes computer-readable instruction, causing the processor to identify the at least one advertisement record based on the triggering data included in the at least one advertisement record.

6. The electronic device of claim 3, wherein each cluster record indicates a set of feature types on which the cluster represented by the cluster record was clustered.

7. The electronic device of claim 6, further comprising:
a second processor that executes computer-readable instructions, the computer-readable instructions, when executed by the second processor, cause the second processor to:
receive an instruction to generate clusters of application records, the instruction including a set of feature types;
cluster the plurality of application records into two or more different clusters based on the application state information and the set of feature types;
for each of the two or more different clusters, obtain a new cluster record based on the cluster, the new cluster record including the state identifiers of the application records in the cluster; and
store the two or more new cluster records in the plurality of clusters.

8. The electronic device of claim 3, wherein the usage data received from each of the user devices includes a search activity log, the search activity log indicating actions performed by a user in response to being presented with search results.

9. The electronic device of claim 1, wherein the advertisement request further contains at least one of a search query, an application state identifier, geo-location data, and at least one keyword, wherein the identifying of the at least one of advertisement record further comprises matching the data included in the advertisement request to triggering data of an advertisement record.

10. The electronic device of claim 9, wherein triggering data comprises the at least one of keyword.

11. The electronic device of claim 9, wherein each advertisement record in the plurality of advertisement records includes bid data, the bid data comprising at least one of geo-location data, a time frame, or a list of application state identifiers.

12. A method for improving relevancy of displayed objects, the method comprising:
maintaining, by a processor, a plurality of advertisement records, each advertisement record including a sponsored state identifier identifying a state of a software application, bid data indicating a value in association with a sponsored link, and triggering data including one or more application state identifiers;
maintaining, by the processor, a plurality of cluster records, each of the plurality of cluster records including clustered state identifiers, each clustered state identifier corresponding to the sponsored state identifier;

receiving, by the processor, an advertisement request, the advertisement request containing at least one application state identifier;

identifying, by the processor, at least one advertisement record from the plurality of advertisement records based on the advertisement request including the at least one application state identifier;

for each identified advertisement record:
  identifying, by the processor, at least one cluster record from the plurality of cluster records based on a sponsored state identifier in the identified advertisement record; and
  identifying, by the processor, an advertisement score for the identified advertisement record indicated by the identified at least one cluster record, wherein the advertisement score is identified based on the at least one of the sponsored state identifiers in the identified advertisement record or the bid data in the identified advertisement record;

selecting, by the processor, at least one identified advertisement record based on advertisement scores for the at least one identified advertisement record;

obtaining, by the processor, at least one sponsored link advertisement objects based on the selected advertisement record; and transmitting, by the processor, the at least one sponsored link advertisement object to a remote device for display.

13. The method of claim 12, further comprising:

maintaining, by a processor, a plurality of application records, each application record including each of the state identifiers, wherein each application record further includes application state information indicating content corresponding to data provided by a software application when a software program is set in the state of the software application indicated by an application state record, and wherein a state identifier comprises at least one of a function identifier, a resource identifier, and/or an application access mechanism.

14. The method of claim 13, wherein the plurality of cluster records are identified based on usage data collected from a plurality of user devices, the usage data indicating states of software applications accessed by users of the user devices.

15. The method of claim 14, wherein at least a subset of the plurality of cluster records include at least one clustered state identifier, each clustered state identifier corresponding to at least one of a popularity feature, a geography feature, or one or more entity features.

16. The method of claim 12, wherein each advertisement record of the plurality of advertisement records includes triggering data indicating data that triggers each of the advertisement records, and wherein the processor executes computer-readable instruction, causing the processor to identify at least one advertisement record based on the triggering data included in the at least one advertisement record.

17. The method of claim 14, wherein each cluster record indicates a set of feature types on which the cluster represented by the cluster record was clustered.

18. The method of claim 17, further comprising:

receiving, by a second processor, an instruction to generate clusters of application records, the instruction including a set of feature types;

clustering, by the second processor, the plurality of application records into two or more different clusters based on the application state information and the set of feature types;

obtaining, by the processor, for each of the two or more different clusters, a new cluster record based on the cluster, the new cluster record including the state identifiers of the application records in the cluster; and storing, by the second processor, the two or more new cluster records in the plurality of clusters.

19. The method of claim 14, wherein the usage data received from each of the user devices includes a search activity log, the search activity log indicating actions performed by a user in response to being presented with search results.

20. The method of claim 12, wherein each advertisement record of the plurality of advertisement records includes triggering data indicating data that triggers the advertisement record, and wherein the advertisement request further contains at least one of a search query, geo-location data, or at least one keyword, wherein the identifying of the at least one advertisement record further comprises matching the data included in the advertisement request to triggering data of an advertisement record.

21. The method of claim 20, wherein triggering data further comprises the at least one of keyword.

22. The method of claim 20, wherein each advertisement record in the plurality of advertisement records includes bid data, the bid data comprising at least one of geo-location data, a time frame, or a list of application state identifiers.

* * * * *